United States Patent
Vahedi et al.

(10) Patent No.: US 9,923,484 B2
(45) Date of Patent: Mar. 20, 2018

(54) METHOD AND SYSTEM FOR OPERATING A MULTILEVEL ELECTRIC POWER INVERTER

(71) Applicant: ECOLE DE TECHNOLOGIE SUPERIEURE, Montreal (CA)

(72) Inventors: Hani Vahedi, Montreal (CA); Kamal Al-Haddad, Montreal (CA)

(73) Assignee: ECOLE DE TECHNOLOGIE SUPERIEURE, Montreal, Quebec (CA)

(*) Notice: Subject to any disclaimer, the term of this patent is extended or adjusted under 35 U.S.C. 154(b) by 0 days.

(21) Appl. No.: 14/929,979

(22) Filed: Nov. 2, 2015

(65) Prior Publication Data
US 2016/0126862 A1    May 5, 2016

Related U.S. Application Data

(60) Provisional application No. 62/073,387, filed on Oct. 31, 2014.

(51) Int. Cl.
*H02M 7/5387* (2007.01)
*H02M 7/537* (2006.01)

(52) U.S. Cl.
CPC .................. *H02M 7/537* (2013.01)

(58) Field of Classification Search
CPC ............................ H02M 7/537; H02M 7/5387
USPC ...... 363/37, 40, 41, 55, 56.01, 56.02, 56.03, 363/95–98, 131–132
See application file for complete search history.

(56) References Cited

U.S. PATENT DOCUMENTS

| | | | |
|---|---|---|---|
| 5,450,306 A * | 9/1995 | Garces | H02M 5/458 363/132 |
| 5,594,630 A * | 1/1997 | Baker | H02J 3/01 307/105 |
| 5,680,299 A * | 10/1997 | Yasuda | H02M 7/5395 363/41 |

(Continued)

FOREIGN PATENT DOCUMENTS

JP    09-182451    7/1997
JP    2006-087257    3/2006

(Continued)

OTHER PUBLICATIONS

Chinnaiyan et al.; "Control Techniques for Multilevel Voltage Source Inverters", IEEE, Power Engineering Conference, 2007, IPEC 2007, International, Dec. 3-6, 2007.

*Primary Examiner* — Adolf Berhane
*Assistant Examiner* — Nusrat Quddus
(74) *Attorney, Agent, or Firm* — Norton Rose Fulbright Canada LLP

(57) ABSTRACT

A controller for operating a multilevel electric power inverter circuit. The controller is configured to generate and apply to the plurality of switching elements switch signal waveforms, the switch signal waveforms comprising a first control signal for causing an energy storage device to be series connected with a direct current source and a load or an alternating current source and charged to a predetermined value proportional to a voltage of the direct current source, and a second control signal for causing the energy storage device to be disconnected from the direct current source and series connected with the load or the alternating current source, thereby causing the energy storage device to be discharged.

19 Claims, 15 Drawing Sheets

(56) References Cited

U.S. PATENT DOCUMENTS

| | | | | |
|---|---|---|---|---|
| 5,793,623 | A | * | 8/1998 | Kawashima ........ H02M 1/4225 363/36 |
| 6,005,787 | A | | 12/1999 | Mizukoshi |
| 6,005,788 | A | | 12/1999 | Lipo et al. |
| 6,058,031 | A | * | 5/2000 | Lyons .................. H02M 7/487 363/132 |
| 6,842,354 | B1 | * | 1/2005 | Tallam ................. H02M 7/487 363/132 |
| 6,998,900 | B2 | | 2/2006 | Kamijo |
| 7,050,311 | B2 | * | 5/2006 | Lai ....................... H02M 5/225 363/37 |
| 7,397,675 | B2 | * | 7/2008 | Neacsu ................ H02M 1/088 363/41 |
| 7,710,082 | B2 | | 5/2010 | Valderrama et al. |
| 7,869,236 | B2 | * | 1/2011 | Mohan ................ H02M 5/271 363/132 |
| 8,982,593 | B2 | * | 3/2015 | Nondahl ............... H02M 1/12 363/36 |
| 2004/0164792 | A1 | | 8/2004 | Yokoyama |
| 2005/0127853 | A1 | | 5/2005 | Su |
| 2007/0147098 | A1 | | 6/2007 | Mori et al. |
| 2007/0189045 | A1 | * | 8/2007 | Gritter .............. H02M 7/53873 363/40 |
| 2008/0298103 | A1 | * | 12/2008 | Bendre ................. H02M 7/487 363/89 |
| 2011/0280052 | A1 | | 11/2011 | Al-Haddad et al. |
| 2012/0218795 | A1 | * | 8/2012 | Mihalache ............ H02M 7/487 363/97 |
| 2013/0014384 | A1 | | 1/2013 | Xue et al. |
| 2015/0200602 | A1 | * | 7/2015 | Narimani ............ H02M 5/4585 363/37 |

FOREIGN PATENT DOCUMENTS

| | | |
|---|---|---|
| JP | 2007-202251 | 8/2007 |
| KR | 20010094397 | 11/2001 |

* cited by examiner

State 1: $V_1=+2E$

State 2: $V_1-V_2=+E$

State 3: $V_2=+E$

State 4: 0

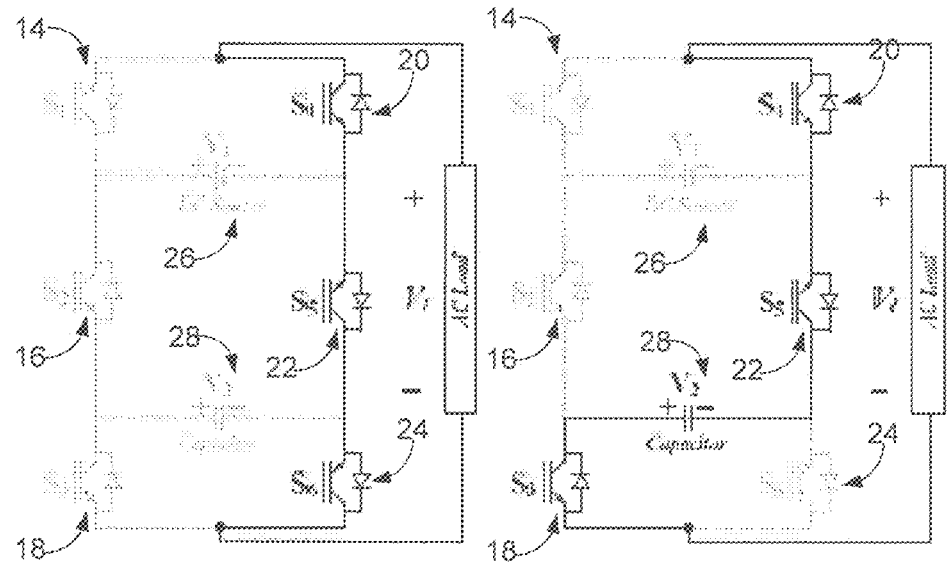
State 5: 0
FIG. 2E
State 6: $-V_2 = -E$
FIG. 2F
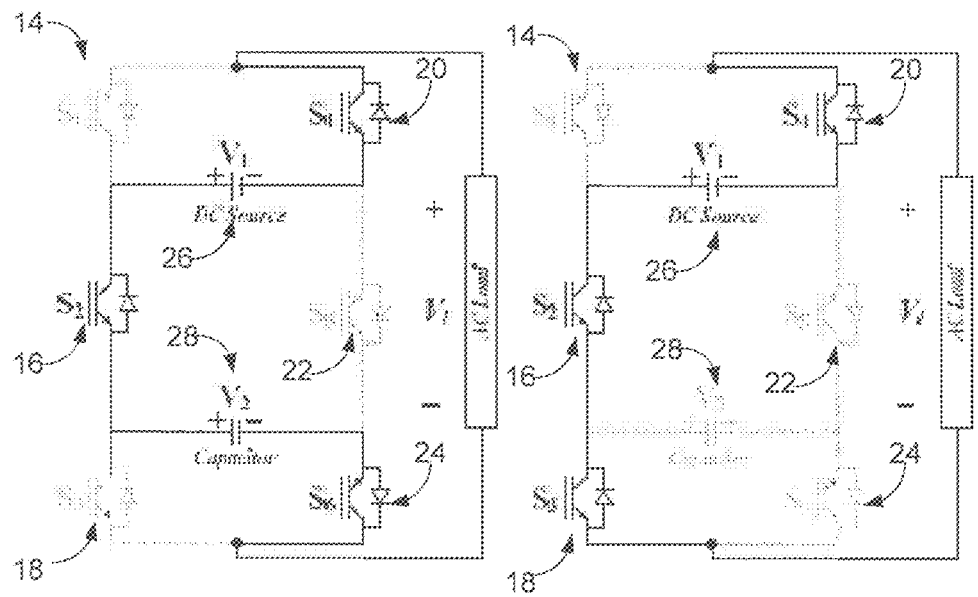
State 7: $V_2 - V_1 = -E$
FIG. 2G
State 8: $-V_1 = -2E$
FIG. 2H

METHOD AND SYSTEM FOR OPERATING A MULTILEVEL ELECTRIC POWER INVERTER

CROSS-REFERENCE TO RELATED APPLICATIONS

The present application claims priority under 35 USC 119(e) of U.S. Provisional Patent Application No. 62/073,387, filed on Oct. 31, 2014, the content of which are hereby incorporated by reference.

TECHNICAL FIELD

The present invention relates to the field of conversion of direct current (DC) to alternating current (AC) and vice versa, and more specifically, to inverters that are multilevel.

BACKGROUND

An inverter is an electrical circuit that converts direct current (DC) to alternating current (AC). Inverters are used in a wide range of applications, from small switching power supplies in computers, to large electric utility applications that transport bulk power. In many applications, it is desirable for the inverter to boost a DC value and convert it into an AC waveform with high efficiency. In particular, it is desirable for maximum available power from a DC source to be delivered to a load with low harmonic distortion.

Due to their high efficiency and low power losses, multilevel inverters have been widely developed over the past few years. Multilevel inverters provide an AC waveform that exhibits multiple steps at several voltage levels. The closer the waveform comes to a perfect sine wave, the less likely it is that harmonics be present in the inverter's environment. Still, while multilevel inverter topologies are successful in reducing harmonics, they quickly become bulky and constricting when the number of voltage levels exceeds three, due to the large number of both active and passive components present in the circuit. In particular, several feedback sensors and pre-charged capacitors are typically used in these topologies, thereby increasing the risk of high voltage spikes during short circuit and faulty conditions. Also, since more DC supplies are used in multilevel inverters compared to conventional two-level inverters, bulky transformers and diode rectifiers are typically required, causing an increase in manufacturing costs. In addition, in order to allow the use of multilevel inverters in applications in which reliability, high security, and safety are required, topologies with isolated DC sources have been used where several isolated transformers and diode bridges are added to the DC side of the multilevel inverter. Industrial multilevel inverters may also be equipped with protection devices, such as voltage or current relays, to improve safety. However, with such solutions, implementation of complex voltage control strategies is often necessary, which proves costly and cumbersome.

Therefore, there is a need for an improved multilevel inverter.

SUMMARY

There is described herein a controller for operating a multilevel electric power inverter circuit. The controller is configured to generate and apply to the plurality of switching elements switch signal waveforms, the switch signal waveforms comprising a first control signal for causing an energy storage device to be series connected with a direct current source and a load or an alternating current source and charged to a predetermined value proportional to a voltage of the direct current source, and a second control signal for causing the energy storage device to be disconnected from the direct current source and series connected with the load or the alternating current source, thereby causing the energy storage device to be discharged.

In accordance with a first broad aspect, there is provided a controller for a multilevel electric power inverter circuit. The controller comprises a modulation circuit configured for generating a plurality of command signals, the command signals indicative of switching states for a plurality of switching elements in the inverter circuit to obtain a given voltage level at an output of the inverter circuit. The controller also comprises a voltage balancing circuit connected to the modulation circuit and connectable to the plurality of switching elements, and configured to generate, as a function of the command signals, switch signal waveforms as half-cycles of an alternating current waveform having alternating periods of positive and negative, for selective opening and closing of the plurality of switching elements to obtain the given voltage level.

In accordance with a second broad aspect, there is provided a method for operating a multilevel electric power inverter circuit. The method comprises generating command signals indicative of switching states for a plurality of switching elements in the inverter circuit to obtain a given voltage level at an output of the inverter circuit; generating, as a function of the command signals, switch signal waveforms as half-cycles of an alternating current waveform having alternating periods of positive and negative, for selective opening and closing of the plurality of switching elements to obtain the given voltage level; and applying the switch signal waveforms to the plurality of switching elements to generate the given voltage level at the output of the inverter circuit.

In accordance with a third broad aspect, there is provided a multilevel electric power inverter system for converting a direct current value into an alternating current waveform having alternating periods of positive and negative half cycle. The system comprises a plurality of switching elements connected in series in a closed loop, selective opening and closing of the plurality of switching elements resulting in given voltage levels for the inverter circuit; a direct current source and an energy storage device connected within the closed loop such that each of the direct current source and the energy storage device is connected to four of the plurality of switching elements; one of a load and an alternating current source connected across the closed loop at nodes between adjacent switching elements that are separate from nodes to which the direct current source and the energy storage device are connected; and a controller connected to the plurality of switching elements and configured to generate and apply to the plurality of switching elements switch signal waveforms, the switch signal waveforms comprising a first control signal for causing the energy storage device to be series connected with the direct current source and the one of the load and the alternating current source and charged to a predetermined value proportional to a voltage of the direct current source, and a second control signal for causing the energy storage device to be disconnected from the direct current source and series connected with the one of the load and the alternating current source, thereby causing the energy storage device to be discharged.

BRIEF DESCRIPTION OF THE DRAWINGS

Further features and advantages of the present invention will become apparent from the following detailed description, taken in combination with the appended drawings, in which:

FIGS. 2A-2H show some embodiments of active switches for the circuit of FIG. 1 for various combinations of on/off;

It will be noted that throughout the appended drawings, like features are identified by like reference numerals.

DETAILED DESCRIPTION

Figure 1:
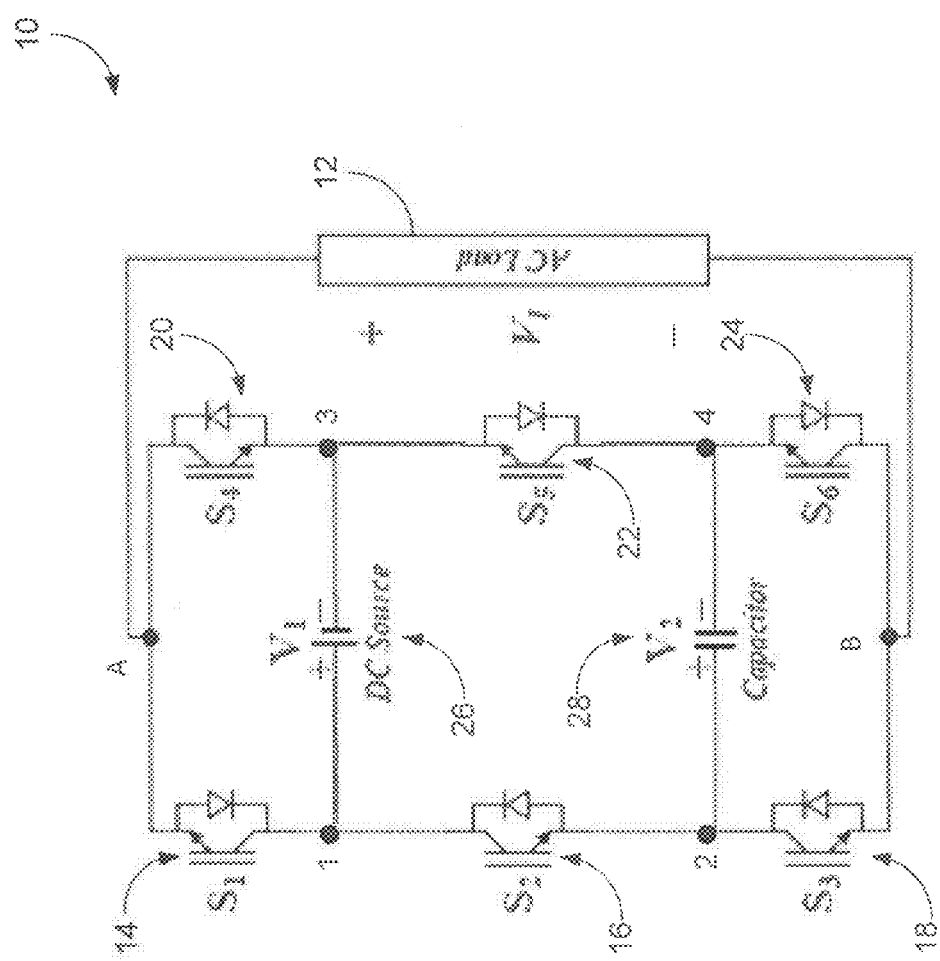
FIG. 1 is a schematic of a five-level Pack-U cell (PUC) inverter, in accordance with one embodiment.

Referring to FIG. 1, there is illustrated a topology 10 for a five-level electric Packed (or Pack) U-Cell (PUC) power inverter in a stand-alone mode of operation, in accordance with one embodiment. An AC load 12 is connected across terminals A and B, which correspond to the only nodes in the circuit where only switching elements are connected. The voltage produced between terminals A and B is the inverter's output voltage ($V_l$), which is illustratively a five-level Pulse Width Modulation (PWM) waveform. Although PWM is referred to herein when describing the control strategy implemented for the proposed PUC inverter, it should be understood that other control techniques may be used, such as but not limited to Selective Harmonics Elimination PWM and Optimized Harmonics Stepped Waveform. PWM such as the Shift PWM technique, the Sinusoidal Natural PWM technique, and the Programmed PWM technique may be used. Open loop and closed loop techniques may be used. Examples of Open loop techniques are Space Vector and Sigma Delta. Examples of Closed loop techniques are Hysteresis Current Controller, Linear Current Controller, DDB Current Controller, and Optimized Current Controller.

Unidirectional controlled switching elements 14, 16, 18, 20, 22, and 24 are disposed in a closed loop such that selective opening and closing of the switches will result in given voltage levels. In the illustrated embodiment, the circuit 10 can generate five different output voltages using the various combinations of switches at on/off states, as will be discussed further below. Switch 14 is provided between terminal A and node 1. Switch 16 is provided between node 1 and node 2. Switch 18 is provided between node 2 and terminal B. Switch 20 is provided between terminal A and node 3. Switch 22 is provided between node 3 and node 4. Switch 24 is provided between node 4 and terminal B. The switching elements 14, 16, 18, 20, 22, and 24 may be implemented using bipolar junction transistors (BJT). A parasitic diode, implicitly present due to the nature of the BJT, is illustrated to indicate the direction of bias of the transistors, namely reverse bias, such that the transistors behave as switches and not as short circuits. It should be noted that alternative means of implementing the switches are possible, such as thyristors, e.g. Gate Turn-Off thyristors (GTOs) or Integrated Gate-Commutated Thyristors (IGCTs), relays, Isolated Gate Bi-polar Transistors (IGBTs), Metal-Oxide-Semiconductor Field-Effect Transistors (MOSFETs), or any other suitable controllable switch.

The circuit 10 further comprises elements as in 26 and 28, which are connected within the closed loop such that each element 26, 28 is connected to four of the switching elements 14, 16, 18, 20, 22, and 24. For this purpose, element 26 is provided between nodes 1 and 3 while element 28 is provided between nodes 2 and 4. In this configuration, each two switching elements 14, 16, 18, 20, 22, and 24 are connected to an element 26, 28 as a U-cell and these U-cells build the overall PUC inverter. The element 26 is illustratively a DC source (i.e. a battery, solar panel, or the like) while the element 28 is a dependent voltage source, e.g. an energy storage device such as a capacitor (as illustrated) or a combination of capacitors (not shown), used as an auxiliary power source. Although the circuit 10 is illustrated as comprising one element 28 to implement a five-level PUC inverter, it should be understood that additional elements 28 may be provided to achieve more levels at the output of the inverter, as will be discussed further below.

When compared to common multilevel inverter configurations, the present design has a lower number of capacitors and switches for an equal number of levels. Table 1 below illustrates the comparison (i.e. the component count) for single-phase five-level inverters while Table 2 illustrates the comparison for single-phase multilevel (i.e. n-level) inverters.

TABLE 1

| Inverter type | DC Source | Capacitor | Clamped Diode | Active Switch | Total Parts Count | Control Complexity |
|---|---|---|---|---|---|---|
| CHB | 2 | 0 | 0 | 8 | 10 | Low |
| NPC with voltage control | 1 | 4 | 6 | 8 | 19 | Very High |
| NPC without voltage control | 4 | 0 | 6 | 8 | 18 | Low |

TABLE 1-continued

| Inverter type | DC Source | Capacitor | Clamped Diode | Active Switch | Total Parts Count | Control Complexity |
|---|---|---|---|---|---|---|
| FC | 1 | 3 | 0 | 8 | 12 | High |
| Present topology | 1 | 1 | 0 | 6 | 8 | Very Low |

TABLE 2

| Inverter type | DC source | Capacitor | Clamped Diode | Active Switch | Total Parts Count |
|---|---|---|---|---|---|
| CHB | $\frac{n-1}{2}$ | 0 | 0 | $2(n-1)$ | $\frac{5(n-1)}{2}$ |
| NPC without voltage control | $n-1$ | 0 | $2(n-2)$ | $2(n-1)$ | $5n-7$ |
| FC | 1 | $n-2$ | 0 | $2(n-1)$ | $3(n-1)$ |
| Present topology | 1 | $\sqrt{n-1}-1$ | 0 | $2(\sqrt{n-1}+1)$ | $3\sqrt{n-1}+2$ |

In Table 1 and Table 2, CHB refers to Cascaded H-Bridge converters, NPC to Neutral Point Clamped converters, and FC to Flying Capacitor converters. As can be seen from Table 1 and Table 2, the present topology has one DC source, one capacitor, and six switches for a five-level inverter (as illustrated in FIG. 1), which is less DC sources than the CHB and NPC without voltage control topologies, less capacitors than the NPC with voltage control and FC topologies, and less switches than the CHB, NPC, and FC topologies.

It should be understood that, although the configuration of FIG. 1 is shown as a five-level inverter, other voltage levels may be produced depending on the chosen variables for the control strategy. Indeed, by increasing the number of elements 28 (e.g. using binary DC links), voltage levels other than five, may be generated at the output of the inverter 10. The additional voltage levels may be generated by increasing the number of capacitors and accordingly setting the capacitor voltage to a desired value relative to the amplitude of the DC source voltage. For example, as can be seen in Table 2, by providing one (1) DC source as in 26 and two (2) capacitors as in 28, a number of levels n=10 can be achieved. Using the proposed control technique, the capacitor voltage would then be set to be constant to a quarter (¼) of the DC source voltage in order to achieve the desired number of voltage levels. It can be seen from Table 2 that levels other than five (5) and ten (10), including but not limited to, seventeen (17) or twenty-six (26) levels, may be achieved by increasing the number of capacitors. In general, it can be seen from Table 2 that a number m of elements (e.g. capacitors) 28, with $m=\sqrt{n-1}-1$, may be used in order to achieve n voltage levels at the inverter's output. Assuming that the element 26 (e.g. the DC source) has a voltage $V_{dc}$, the voltage of the m-th capacitor may then be fixed at a value of $2^{-m} \times V_{dc}$.

Figure 2A:
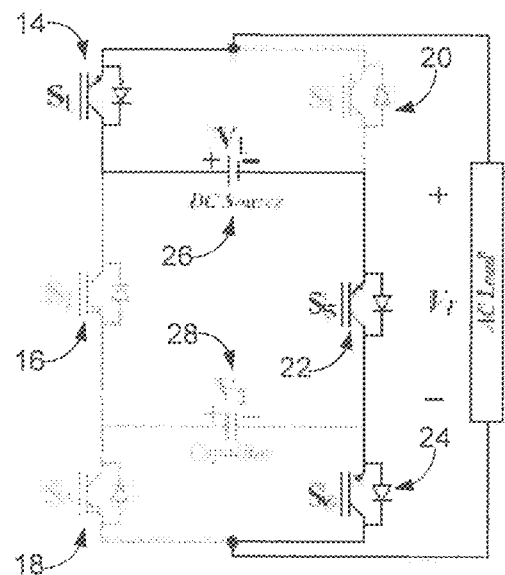

FIGS. 2A to 2H illustrate the active switches for various possible output voltages ($V_I$) when using the configuration of FIG. 1 to produce five levels in inverter mode. The pairs of switching elements 14 and 20, 16 and 22, and 18 and 24, operate complementarily such that each switch 14, 16, and 18 of a pair operates complementarily to (i.e. cannot be switched on simultaneously as) the other switch 20, 22, and 24 of the pair. In FIG. 2A (illustrative of switching state 1), switches 14, 22, and 24 are activated, leading to an output voltage of $V_1$. The remaining FIGS. 2B to 2H are self-explanatory when combined with Table 3, which illustrates the combinations of switches (i.e. switching states) for the inverter topology 10 of FIG. 1. A given switch has a state of 1 if the switch is on (i.e. conducting) and a state of 0 if the switch is off (i.e. not conducting).

TABLE 3

| State | Switch 14 | Switch 16 | Switch 18 | Output voltage |
|---|---|---|---|---|
| 1 | 1 | 0 | 0 | $V_1$ |
| 2 | 1 | 0 | 1 | $V_1 - V_2$ |
| 3 | 1 | 1 | 0 | $V_2$ |
| 4 | 1 | 1 | 1 | 0 |
| 5 | 0 | 0 | 0 | 0 |
| 6 | 0 | 0 | 1 | $-V_2$ |
| 7 | 0 | 1 | 0 | $V_2 - V_1$ |
| 8 | 0 | 1 | 1 | $-V_1$ |

As is noted from Table 3, eight (8) existing switching states may provide different paths for current to flow through the circuit 10. As is also noted from Table 3, the number of output levels may depend on the value of the voltage ($V_1$) across the DC source 26 and on the value of the voltage ($V_2$) across the capacitor 28. Using unequal voltage amplitudes can therefore result in different numbers of levels in the output voltage waveform. Considering Table 3, it can be seen that the PUC inverter has the ability to be a five-level inverter by assuming $V_1=2V_2=2E$, resulting in a five-level output voltage waveform comprising voltage levels 0, ±E, ±2E. This may be achieved by keeping the capacitor voltage ($V_2$) constant at half the amplitude of the DC source voltage ($V_1$).

Table 4 below illustrates some voltage levels that may be generated by such a five-level PUC inverter.

TABLE 4

| State | Switch 14 | Switch 16 | Switch 18 | Output voltage | $V_I$ |
|---|---|---|---|---|---|
| 1 | 1 | 0 | 0 | $V_1$ | +2E |
| 2 | 1 | 0 | 1 | $V_1 - V_2$ | +E |
| 3 | 1 | 1 | 0 | $V_2$ | +E |
| 4 | 1 | 1 | 1 | 0 | 0 |
| 5 | 0 | 0 | 0 | 0 | 0 |
| 6 | 0 | 0 | 1 | $-V_2$ | -E |
| 7 | 0 | 1 | 0 | $V_2 - V_1$ | -E |
| 8 | 0 | 1 | 1 | $-V_1$ | -2E |

From Table 4, it can be seen that six (6) switching states may be used to produce three (3) voltage levels including -E, 0 and +E. In particular, there are two options, namely switching states 2 and 3, to obtain an output voltage of +E, two options, namely switching states 4 and 5, to obtain zero output voltage, and two options, namely switching states 6 and 7, to obtain an output voltage of -E. Therefore, some redundant switching states, i.e. states which achieve a same voltage level, are present and may help find different paths for current to flow through the load 12. As will be discussed further below, these redundant switching states can be used for regulation, e.g. charging and discharging, of the capacitor 28 in order to balance the capacitor voltage at half of the DC source voltage.

Indeed, as can be seen from FIGS. 2A-2H, in states where the DC source 26 and the capacitor 28 are connected in series with the load 12 (e.g. states 2 and 7), the capacitor 28 is charging. On the other hand, on paths where the DC source 26 is not connected to the load 12 and capacitor 28 feeds the load 12 alone (e.g. states 3 and 6), the capacitor 28 is discharging. For the remaining states, the capacitor voltage remains unchanged because the capacitor 28 is neither connected to the DC source 26 nor to the load 12. These charging and discharging states of the capacitor 28 are indicated in Table 5 below, from which it is noted that different switching states have different effects on the capacitor voltage.

TABLE 5

| State | Capacitor voltage |
|-------|-------------------|
| 1 | No effect |
| 2 | Charging |
| 3 | Discharging |
| 4 | No effect |
| 5 | No effect |
| 6 | Discharging |
| 7 | Charging |
| 8 | No effect |

Therefore, taking into account the presence of the redundant switching states and their effect on capacitor voltage, it becomes possible to design a control strategy for the inverter 10 in which a capacitor self-voltage-balancing feature is integrated into the modulation technique (e.g. Pulse Width Modulation (PWM)), as will be discussed further below. Thus, the inverter's control strategy does not necessitate any feedback sensors or other complex circuitry. This in turn simplifies implementation of the controller and improves the dynamic performance and response.

It can indeed be seen from Tables 4 and 5 that the capacitor 28 can be charged or discharged in each positive or negative half cycle of the inverter's output voltage. In order to keep the capacitor voltage fixed, in the proposed control strategy, the capacitor 28 is thus charged in the positive half cycle and discharged in the negative half cycle. It should be understood that the capacitor 28 may be charged in one full cycle and discharged in the following full cycle, thus alternating the charging and discharging process cycle by cycle. Still, in order to avoid high switching frequency and therefore achieve stability, it may be desirable for the charging and the discharging process to both occur within a single cycle (e.g. charging in the positive half cycle and discharging in the negative half cycle). The two zero voltage states (e.g. states 4 and 5) may then be used alternatively to balance the capacitor voltage.

Thus, in the charging states (e.g. states 2 and 7), the capacitor 28 is charged when it is connected in series with the DC source 26 and the load 12. The load voltage should therefore be ±E and the following equations can be written:

$$V_1 = V_2 + V_l \Rightarrow \begin{cases} 2E = V_2 + E \\ -2E = V_2 - E \end{cases} \Rightarrow |V_2| = E \quad (1)$$

It can be seen that, with the DC source voltage fixed at 2E, it is desirable for the capacitor 28 to be charged up to E (i.e. half of the DC source voltage value) in order to produce the proper output load voltage. In one embodiment, the frequency of the output voltage waveform is 60 Hz. Since, the capacitor 28 is illustratively charged to half of the amplitude of the DC source, the capacitor's charging (and accordingly discharging) time is then about $0.7\tau$, where $\tau$ is the time constant of the capacitor 28.

In order to have equivalent times of charging and discharging in one period, the switching state 2 may illustratively be chosen to connect the DC source 26 to the capacitor 28 and charge the latter, while, in order to prevent overcharge, the capacitor 28 may be discharged in the negative half cycle through the switching state 6, which connects the capacitor 28 directly to the load 12. This procedure may be independent of the switching frequency and output voltage frequency. The capacitor charging and discharging times illustratively only depend on the value of the load 12 and have a direct effect on the capacitor size. In turn, the size of the capacitor 28 may be considered when calculating system parameters for specific application design. In particular, larger loads may require a smaller capacitor in the DC link, and vice versa.

The self-voltage balancing procedure described above may be mathematically derived based on capacitor energy relations, as follows.

Figure 3:
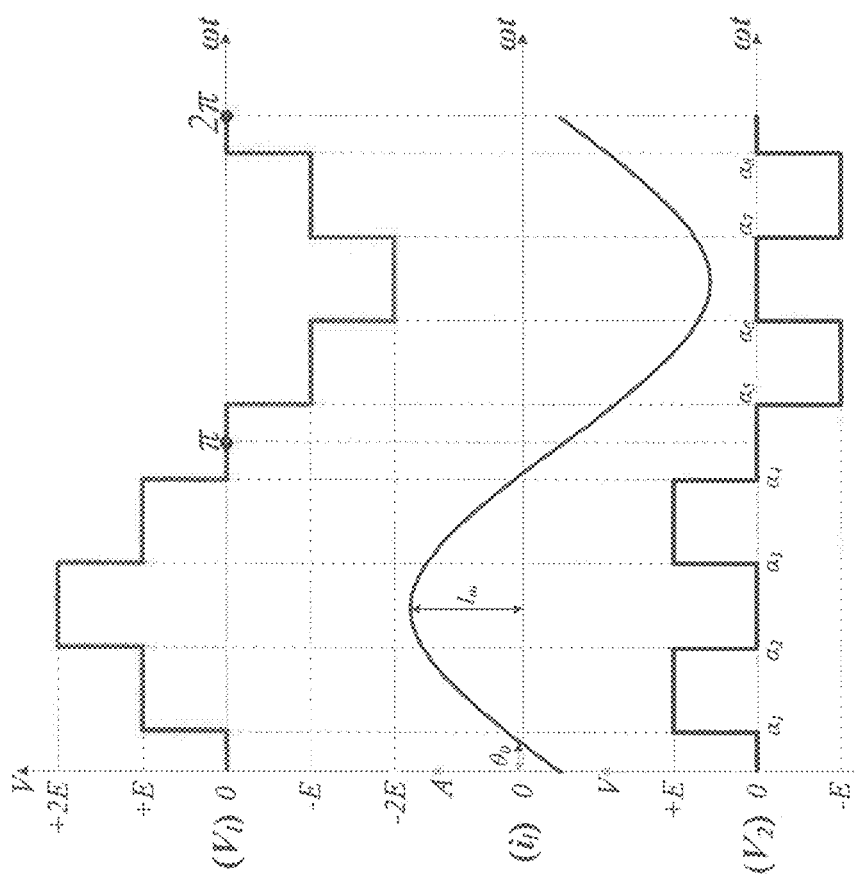
FIG. 3 is a graph illustrating an exemplary output voltage and current waveform of the five-level inverter of FIG. 1.

FIG. 3 illustrates one cycle of an exemplary output voltage and current waveforms for the inverter 10 of FIG. 1. The output voltage ($v_l$) and output current ($i_l$) current can be assumed as the following sine functions:

$$v_l(t) = V_m \mathrm{Sin}(\omega t) \quad (2)$$

$$i_l(t) = I_m \mathrm{Sin}(\omega t - \theta_0) \quad (3)$$

where $V_m$ is the maximum value of the output voltage waveform, $I_m$ is the maximum value of the current waveform, and $\theta_0$ is the phase difference between the output voltage and the current.

Taking into account the energy absorbed by or delivered to the load 12 by the DC capacitor 28, the following equations can be written:

$$I = \frac{dq}{dt} \quad (4)$$
$$\rightarrow dU = Vdq = VIdt$$
$$\rightarrow U = \int VIdt$$

where I is the current, q is the electric charge, V is the voltage, and U is the energy of the capacitor 28.

Substituting equation (3) into equation (4), the capacitor energy delivered by or absorbed in the inverter 10 can be derived in periods of the positive and negative half-cycle of the output voltage, with the capacitor voltage being a fixed value ($V_2$). The capacitor energy in the positive half-cycle, referred to as $U^+$, can then be written as:

$$U^+ = \int_0^\pi V_2 I_m \mathrm{Sin}(\omega t - \theta_0) d(\omega t) \quad (5)$$

$$= I_m \int_0^\pi V_2 \mathrm{Sin}(\omega t - \theta_0) d(\omega t)$$

$$= I_m \begin{bmatrix} \int_0^{\alpha_1} 0 \times \mathrm{Sin}(\omega t - \theta_0) d(\omega t) + \\ \int_{\alpha_1}^{\alpha_2} E \times \mathrm{Sin}(\omega t - \theta_0) d(\omega t) + \\ \int_{\alpha_2}^{\alpha_3} 0 \times \mathrm{Sin}(\omega t - \theta_0) d(\omega t) + \\ \int_{\alpha_3}^{\alpha_4} E \times \mathrm{Sin}(\omega t - \theta_0) d(\omega t) + \\ \int_{\alpha_4}^{\pi} 0 \times \mathrm{Sin}(\omega t - \theta_0) d(\omega t) \end{bmatrix}$$

$$= -EI_m \mathrm{Cos}(\omega t - \theta_0)|_{\alpha_1}^{\alpha_2} - EI_m \mathrm{Cos}(\omega t - \theta_0)|_{\alpha_3}^{\alpha_4}$$

-continued $$= EI_m \begin{bmatrix} \cos(\alpha_1 - \theta_0) - \cos(\alpha_2 - \theta_0) + \\ \cos(\alpha_3 - \theta_0) - \cos(\alpha_4 - \theta_0) \end{bmatrix}$$

The capacitor energy in the negative half-cycle, referred to as $U^-$, can be written as:

$$U^- = \int_\pi^{2\pi} V_2 I_m \sin(\omega t - \theta_0) d(\omega t) \qquad (6)$$

$$= I_m \int_\pi^{2\pi} V_2 \sin(\omega t - \theta_0) d(\omega t)$$

$$= EI_m \cos(\omega t - \theta_0)\big|_{\alpha_5}^{\alpha_6} + EI_m \cos(\omega t - \theta_0)\big|_{\alpha_7}^{\alpha_8}$$

$$= EI_m \begin{bmatrix} \cos(\alpha_6 - \theta_0) - \cos(\alpha_5 - \theta_0) + \\ \cos(\alpha_8 - \theta_0) - \cos(\alpha_8 - \theta_0) \end{bmatrix}$$

Noticing from FIG. 3 that two half cycles of the output voltage are symmetric, it can be assumed that:

$$\begin{cases} \alpha_5 = \pi + \alpha_1 \\ \alpha_6 = \pi + \alpha_2 \\ \alpha_7 = \pi + \alpha_3 \\ \alpha_8 = \pi + \alpha_4 \end{cases} \qquad (7)$$

The energy amount in half cycles would then be equal in value but opposite in sign, leading to the following equation:

$$U^- = -U^+ \qquad (8)$$

From equation (8), it can be seen that the capacitor energy in the full cycle is balanced and maintained constant, which leads to keeping the capacitor voltage at the desired level in all conditions since the reference waveform (discussed further below) is periodical.

Figure 4:
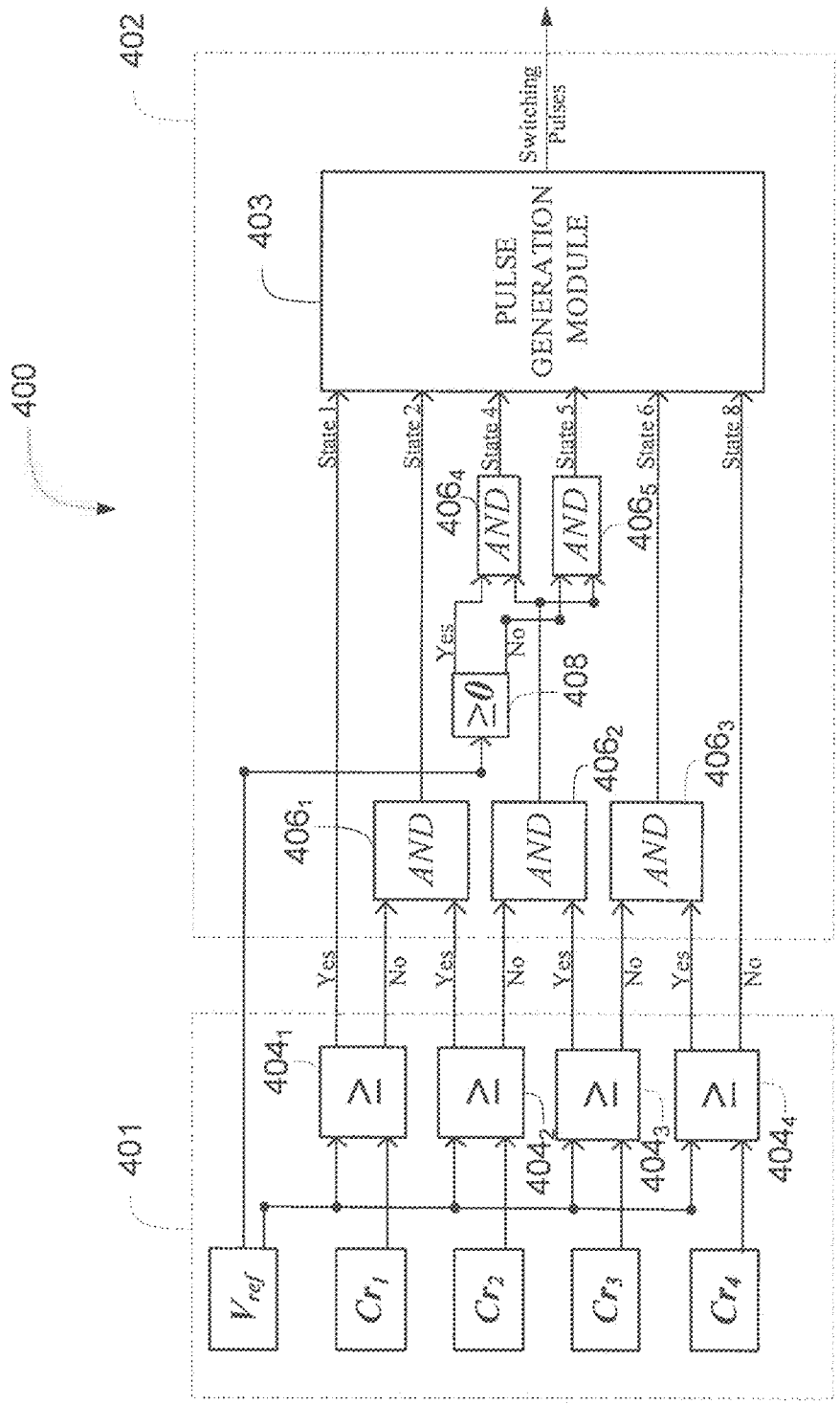
FIG. 4 is a schematic of an exemplary controller for self-voltage-balancing of the five-level inverter of FIG. 1.
Figure 5:
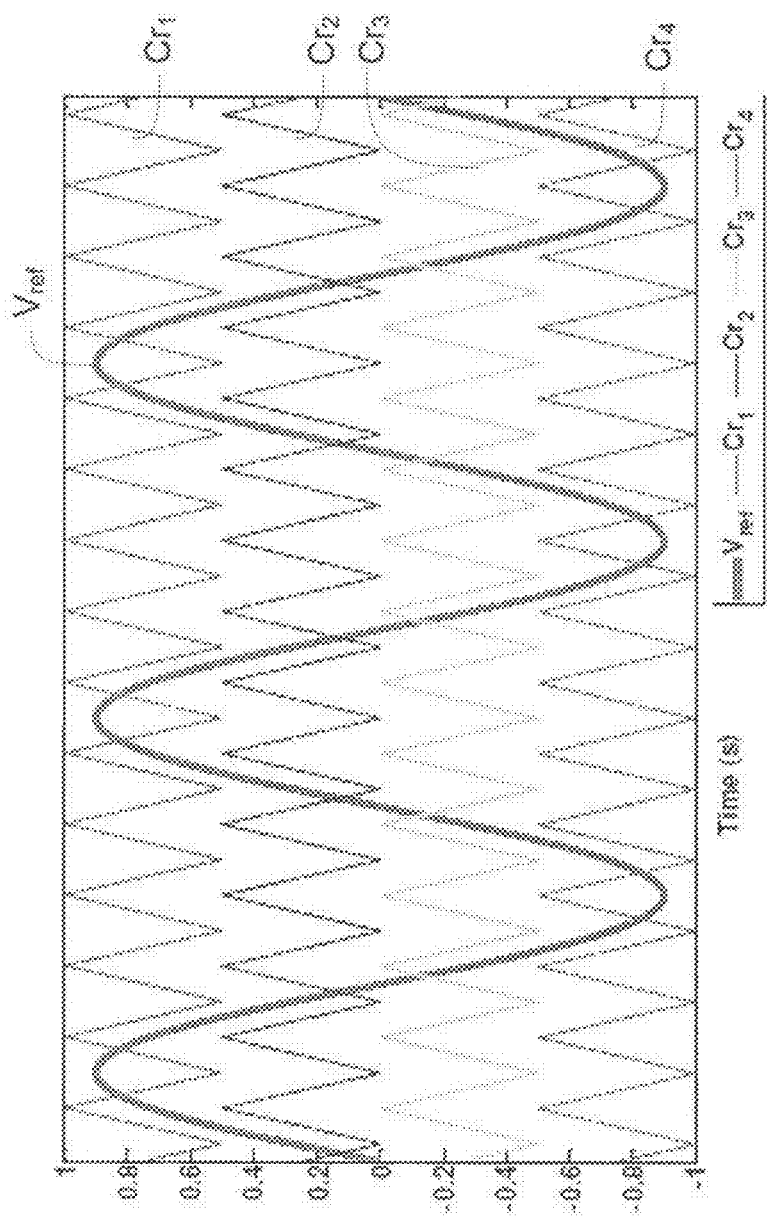
FIG. 5 is a graph illustrating a five-level Pulse Width Modulation (PWM) scheme, in accordance with one embodiment.

The proposed switching technique for self-voltage balancing of a five-level inverter, such as that of FIG. 1, will now be described with reference with FIG. 4 and FIG. 5. Referring to FIG. 4, the proposed switching technique is implemented by a switching unit 400 for causing a five-level voltage waveform to be generated at the inverter's output. The switching unit 400 illustratively comprises a modulation unit 401 and a self-voltage balancing unit 402 comprising a pulse generation module 403. As will be discussed further below, the pulse generation module 403 generates switch signal waveforms (i.e. pulses) that control the inverter's switching elements 14, 16, 18, 20, 22, 24.

The switching unit 400 further comprises a plurality of first comparators as in $404_1$, $404_2$, $404_3$, $404_4$ provided in the modulation unit 401, and a plurality of "AND" logical units as in $406_1$, $406_2$, $406_3$, $406_4$, $406_5$ as well as a second comparator 408 provided in the self-voltage balancing unit 402. The pulse generation module 403 may be implemented using an Application Specific Integrated Circuit (ASIC), a Field-Programmable Gate Array (FPGA), a Digital Signal Processor (DSP), a microcontroller, and/or any other suitable processing device. The logical units $406_1$, $406_2$, $406_3$, $406_4$, $406_5$ may be implemented using digital logic gates or the like while the comparators $404_1$, $404_2$, $404_3$, $404_4$, 408 may be implemented using any suitable comparator device.

The modulation unit 401 illustratively uses as input four (4) triangular carrier waveforms $Cr_1$, $Cr_2$, $Cr_3$, and $Cr_4$ and a reference waveform $V_{ref}$, which may be generated within the modulation unit 401 or received from one or more external units (not shown), such as wave or carrier generators connected to the switching unit 400. The reference waveform $V_{ref}$ has a given fundamental frequency (e.g. 60 Hz), a given amplitude that may be limited by the maximum voltage that can be produced by the inverter 10, and a given phase. As seen in FIG. 5, all carrier waveforms $Cr_1$, $Cr_2$, $Cr_3$, and $Cr_4$ illustratively have the same frequency and amplitude and are vertically shifted relative to one another (thereby occupying contiguous bands) in order to completely modulate the reference waveform $V_{ref}$, which is centered in the middle of the carrier set.

In order to generate the switching pulses, the carrier signals $Cr_1$, $Cr_2$, $Cr_3$, and $Cr_4$ and the reference waveform $V_{ref}$ may be continuously compared. Each carrier waveform $Cr_1$, $Cr_2$, $Cr_3$, $Cr_4$ is indeed compared to the reference waveform $V_{ref}$ using comparator $404_1$, which in turn provides an output signal on the basis of the comparison. In particular, the reference waveform $V_{ref}$ is first compared to carrier wave $Cr_1$ at comparator $404_1$ to determine whether the amplitude of the reference waveform $V_{ref}$ is larger than (e.g. greater than or equal to) that of carrier wave $Cr_1$, compared to carrier wave $Cr_2$ at comparator $404_2$, compared to carrier wave $Cr_3$ at comparator $404_3$, and compared to carrier wave $Cr_4$ at comparator $404_4$.

As will be discussed further below, the comparators' output signals may then be used at the self-voltage balancing unit 402 to generate the firing pulses associated with switching states 1, 2, 4, 5, 6 and 8 (listed in Table 4 above). Indeed, switching state 3 being redundant with switching state 2, as discussed above, both switching states 2 and 3 need not be generated and it is sufficient to synthesize firing pulses for only one of those states, e.g. switching state 2. Similarly, switching state 7 being redundant with switching state 6, as discussed above, both switching states 6 and 7 need not be generated and it is sufficient to synthesize firing pulses for only one of those states, e.g. switching state 6. In addition, it may be desirable to trigger a single charging state and a single discharging state within the same cycle. The choice of which switching state among two redundant switching states to generate is then made taking into account the redundancy of the switching states. For example, when generating a charging state, e.g. switching state 2, in the positive half cycle, a corresponding discharging state, e.g. switching state 6, may be generated in the negative half cycle instead of generating the other possible switching state, e.g. charging switching state 7, that produces the same output level (e.g. −E). In this manner, balancing of the capacitor voltage can be achieved.

Still referring to FIG. 4, if the amplitude of the reference waveform $V_{ref}$ is larger than that of carrier wave $Cr_1$, i.e. the output of comparator $404_1$ is "Yes" or "True", the output signal provided by the comparator $404_1$ is sent to the pulse generation module 403 so that switching state 1 is generated. If the amplitude of the reference waveform $V_{ref}$ is smaller than that of carrier wave $Cr_1$ (i.e. the output of comparator $404_1$ is "No" or "False") and the amplitude of the reference waveform $V_{ref}$ is larger than that of carrier wave $Cr_2$ (i.e. the output of comparator $404_2$ is "Yes"), as determined by taking the logical "AND" of the "No" output signal of comparator $404_1$ and the "Yes" output signal of comparator $404_2$ at logical gate $406_1$, switching state 2 is generated. If the amplitude of the reference waveform $V_{ref}$ is smaller than that of carrier wave $Cr_3$ (i.e. the output of comparator $404_3$ is "No") and the amplitude of the reference waveform $V_{ref}$ is larger than that of carrier wave $Cr_4$ (i.e. the output of comparator $404_4$ is "Yes"), as determined by taking the logical "AND" of the "No" output signal of comparator $404_3$ and the "Yes" output signal of comparator $404_4$ at logical gate $406_3$, switching state 6 is generated. If the amplitude of the reference waveform $V_{ref}$ is smaller than that of carrier wave $Cr_4$, i.e. the output of comparator $404_4$ is "No", the output signal provided by the comparator $404_4$ is sent to the pulse generation module 403 so that switching state 8 is generated.

Redundant switching states 4 and 5, which, as can be seen from Table 5, have no effect on the capacitor voltage and produce an output voltage of zero volts, are illustratively used to reduce the inverter's switching frequency. These states may be generated by first comparing (e.g. using comparator 408) the amplitude of the reference waveform $V_{ref}$ to zero and determining from the comparison whether the amplitude of the reference waveform $V_{ref}$ is positive. Switching state 4 is then generated to produce the zero level at the inverter's output if the amplitude of the reference waveform $V_{ref}$ is positive (i.e. the output of comparator 408 is "Yes"), the amplitude of the reference waveform $V_{ref}$ is smaller than that of carrier wave $Cr_2$ (i.e. the output of comparator $404_2$ is "No"), and the amplitude of the reference waveform $V_{ref}$ is larger than that of carrier wave $Cr_3$ (i.e. the output of comparator $404_3$ is "Yes"), as determined by taking at logical gate $406_4$ the logical "AND" of the "Yes" output signal of comparator 408 and the output signal of logical "AND" gate $406_2$. On the other hand, switching state 5 is generated to produce the zero level at the inverter's output if the amplitude of the reference waveform $V_{ref}$ is negative (i.e. the output of comparator 408 is "No"), the amplitude of the reference waveform $V_{ref}$ is smaller than that of carrier wave $Cr_2$ (i.e. the output of comparator $404_2$ is "No"), and the amplitude of the reference waveform $V_{ref}$ is larger than that of carrier wave $Cr_3$ (i.e. the output of comparator $404_3$ is "Yes"), as determined by taking at logical gate $406_5$ the logical "AND" of the "Yes" output signal of comparator 408 and the output signal of logical "AND" gate $406_2$.

Upon receiving the output signals from the comparators $404_1$, $404_4$, or from the logical gates $406_1$, $406_4$, $406_5$, $406_3$, the signals being indicative of the switching state to be generated, the pulse generation module 403 processes the signals accordingly and synthesizes the corresponding switching pulses which are in turn output to each one of the switching elements 14, 16, 18, 20, 22, and 24 of FIG. 1, thereby controlling operation thereof and causing the desired switching state to be generated. In particular, during the positive half-cycle (or a first full cycle), the pulse generation module 403 outputs a first control signal to the switching elements 14, 16, 18, 20, 22, and 24 such that the latter are operated so that the capacitor (reference 28 in FIG. 1) is series connected with the direct current source and one of the load and the alternating current source, and therefore charged. During the negative half-cycle following the positive half-cycle (or during a second full cycle following the first full cycle), the pulse generation module 403 outputs a second control signal to the switching elements 14, 16, 18, 20, 22, and 24 such that the latter are operated so that the capacitor 28 is disconnected from the direct current source and series connected with one of the load and the alternating current source, and therefore discharged.

In addition, during the positive half-cycle (or the first full cycle) the pulse generation module 403 may be adapted to output a third control signal indicative of state 1 as presented in FIG. 2A. During the negative half-cycle (or the second full cycle) the pulse generation module 403 may be adapted to output a fourth control signal indicative of state 8 as presented in FIG. 2H. Furthermore, during the positive half-cycle (or the first full cycle) the pulse generation module 403 may be adapted to output a fifth control signal indicative of state 4 as presented in FIG. 2D. During the negative half-cycle (or the second full cycle) the pulse generation module 403 may be adapted to output a sixth control signal indicative of state 5 as presented in FIG. 2E.

It should be understood that although the switching unit 400 is illustrated and described herein as using a PWM modulation technique to generate a five-level voltage output at the inverter, the switching unit 400 may be used to generate a voltage waveform having more than five voltage levels. For this purpose, the modulation unit 401 and the self-voltage balancing unit 402 may be modified such that additional carrier waveforms (e.g. more than four (4) triangular carrier waveforms as in $Cr_1$, $Cr_2$, $Cr_3$, and $Cr_4$) are used as input to the modulation unit 401 and additional "AND" logical units as in $406_1$, $406_2$, $406_3$, $406_4$, $406_5$ are provided in the self-voltage balancing unit 402. Also, the modulation unit 401 may be modified according to the modulation technique that is to be implemented.

Using the switching unit 400, a five-level voltage waveform can therefore be produced at the output of the inverter 10 with low switching frequency while fixing the capacitor voltage at a desired level (i.e. at half of the DC source voltage) without the need for any feedback sensors or cumbersome control strategies. Indeed, as described above, the PUC inverter's external voltage and the capacitor voltage can be controlled without using any sensor and the PUC inverter can thus be operated through sensor-less control. Although sensors may be used when the PUC inverter is operated in a grid-connected mode of operation, as discussed further below, for sensing grid side voltage and current, sensors are not used for voltage control of the inverter. Moreover, using the proposed sensor-less control technique, the capacitor voltage remains constant even in start-up and/or load change conditions. In particular, the system may be operated from zero volts up to a desired amplitude (e.g. 600 volts), thereby alleviating the need for pre-charging the capacitor before operating the inverter's switches. Also, the system may be operated in circumstances of DC source voltage variation. The proposed switching technique may therefore make the system faster and more reliable than common PUC inverter controllers, in addition to reducing the number of components required in the inverter topology. In particular, using the proposed control technique alleviates the need for adding transformers to the DC side of the multilevel inverter.

The proposed inverter topology can be used in a wide range of applications, from small switching power supplies in computers, to large electric utility applications that transport bulk power. In addition, the proposed inverter topology can be applicable in many fields and applications, including but not limited to, renewable energy conversion, solar power plants, motor drives, Uninterruptible Power Supplies (UPS), and photovoltaic and wind power conversion as grid interface utility. The proposed topology and control technique may also be extended to smart-grid, micro-grid, grid-connected and islanded inverters. For instance, the proposed PUC inverter can be used in solar energy applications where a multilevel inverter is employed to convert the multiple available DC bus sub voltages of different photovoltaic panels to regulate AC voltage of the grid and deliver the energy to the loads. The PUC inverter can also be used as a single inverter supplying AC loads when the grid is interrupted. For micro-grid and smart-grid applications, the inverter can interconnect different energy sources and regulate the AC voltage to supply loads, especially domestic ones, in a local network. Other possible applications of the inverter 10 will be readily understood.

Figure 6:
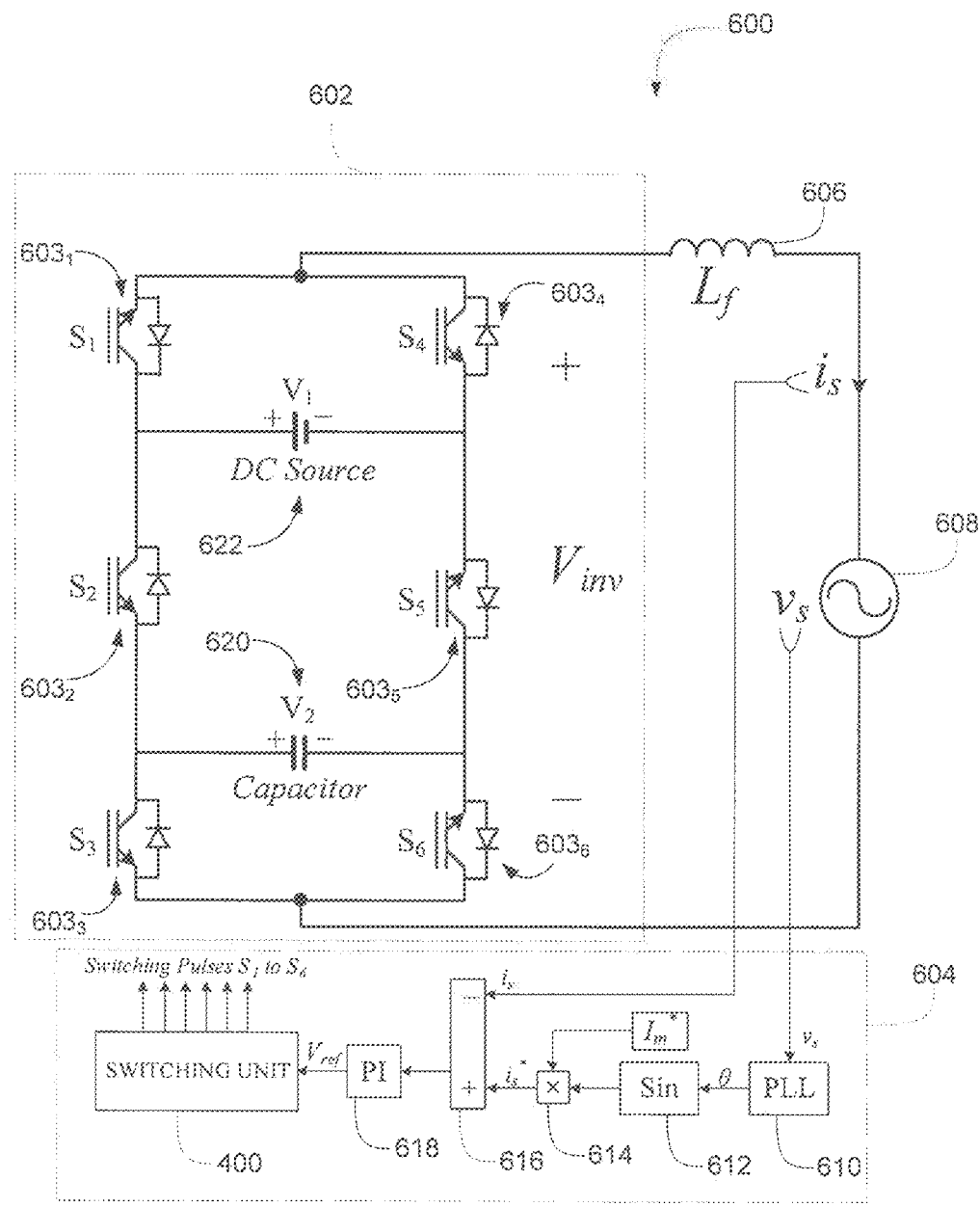
FIG. 6 is a schematic of the five-level PUC inverter of FIG. 1 in a grid-connected mode of operation, in accordance with one embodiment.

One exemplary application will now be described with reference to FIG. 6. FIG. 6 illustrates a configuration 600 of a grid-connected mode of operation for a five-level sensor-less PUC inverter 602. In this configuration 600, the switching elements $603_1$, $603_2$, $603_3$, $603_4$, $603_5$, $603_6$, of the inverter 602 are illustratively operated by a controller 604. The inverter 602 is connected (e.g. through an inductor 606 having a line inductance $L_f$) to the grid, which is represented by an AC source 608 having a voltage $v_S$, and injects a current $i_S$ to the grid. The current $i_S$ is illustratively output by the inverter 602 so as to be in phase with the voltage $v_S$, causing the inverter 602 to send active power to the grid. The controller 604 illustratively comprises the switching unit 400 (discussed above with reference to FIG. 4), a Phase-Locked Loop (PLL) block 610, a sine wave generator (or "Sin" block) 612, a multiplication block 614, a comparator block 616, and a proportional-integral (PI) linear regulator 618.

In operation, a measurement of the AC source voltage $v_S$ (e.g. obtained using suitable sensors, not shown) is received at the controller 604 and used at the PLL block 610, which determines therefrom the AC source voltage's phase θ. The value of the phase θ is then sent to the sine wave generator 612, which in turn produces a unit sine wave in phase with the grid voltage. The unit sine wave is then sent to the multiplication block 614 where it is multiplied with a predefined maximum reference current ($I_m^*$). In this manner, the amount of power that is injected by the inverter 602 to the grid can be controlled and prevented from exceeding a predefined maximum value. The output of the multiplication block 614 is a reference current ($i_s^*$), which is the desired current to be generated by the inverter 602. A measurement of the actual current ($i_S$) generated by the inverter 602 (e.g. obtained using suitable sensors, not shown) is then received at the controller 604 and sent along with the reference current ($i_s^*$) to the comparator block 616 where the currents are compared and an error (e.g. difference) therebetween computed. An error signal is then output by the comparator block 616 and sent to the PI regulator 618, which processes the signal to output a reference voltage signal $V_{ref}$ that minimizes the error. The voltage signal $V_{ref}$ output by the PI regulator 618 is then sent to the switching unit 400, which in turn modulates the reference voltage signal $V_{ref}$ and balances the voltage of the inverter's capacitor 620 at half of the amplitude of the inverter's DC source 622 (in the manner discussed above with reference to FIG. 4). The switching unit 400 generates control signals in the form of switching pulses, which are sent to each switching element $603_1$, $603_2$, $603_3$, $603_4$, $603_5$, $603_6$ so that the set of switching elements $603_1$, $603_2$, $603_3$, $603_4$, $603_5$, $603_6$ are activated accordingly.

Using the proposed controller 604, the inverter 602 illustratively generates and injects into the grid a lower harmonic current waveform compared to conventional single-phase full-bridge grid-connected inverters due to the generation of more voltage levels at the output. In addition, the controller 604 is simpler than conventional controllers.

Figure 7:
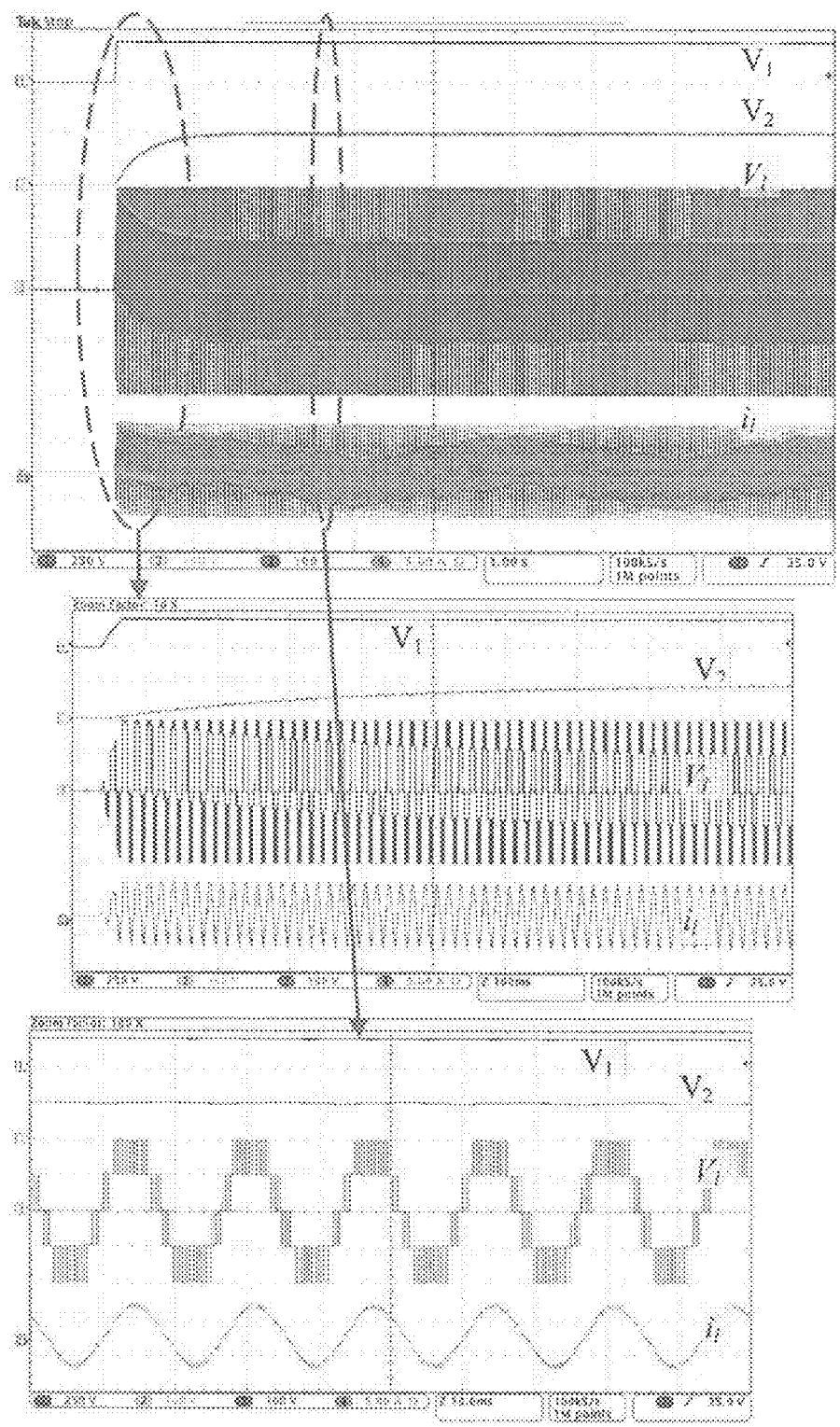
FIG. 7 illustrates the startup mode and five-level voltage generation for a five-level PUC inverter in a stand-alone mode of operation, in accordance with one embodiment.

Referring now to FIG. 7, in order to validate the proposed five-level inverter with self-voltage balancing in both stand-alone and grid-connected modes of operation, experimental tests were performed on a prototype PUC inverter having parameters listed in Table 6 below:

TABLE 6

| | |
|---|---|
| Grid voltage ($v_s$) | 110 V rms |
| Grid Frequency | 60 Hz |
| Grid Link Inductor ($L_f$) | 4 mH |
| DC Source Voltage ($V_1$) | 200 V |
| Switching Frequency | 2 kHz |
| Stand-Alone mode RL Load | 40 Ω, 20 mH |
| Stand-Alone mode Rectifier Load (DC Side $R_{dc}$ and $L_{dc}$) | 40 Ω, 50 mH |
| DC Capacitor | 2500 μF |

Six (6) IGBTs were used as active switches. The proposed self-voltage balancing procedure was integrated into the switching technique and the so-designed grid-connected controller was simulated using a dSpace DS1103 PPC controller board as a real-time controller, with switching pulses being sent to the inverter switches.

In a first set of tests, the inverter was tested in stand-alone mode as a UPS application under various conditions including change in load and change in DC source. In this mode, the inverter supplies an RL load at all times. The inverter's startup mode is shown in FIG. 7. As can be seen in FIG. 7, the capacitor (see capacitor voltage waveform $V_2$) is charged up to half of the DC source's voltage ($V_1$) using the above-mentioned sensor-less voltage balancing approach and a five-level output voltage ($V_l$) is generated symmetrically. Also, the output voltage waveform does not contain any dangerous spikes and the capacitor voltage ($V_2$) has low, almost negligible ripple, thereby reducing output harmonics. Also, it can be seen that the load current waveform ($i_l$) is sinusoidal.

Figure 8:
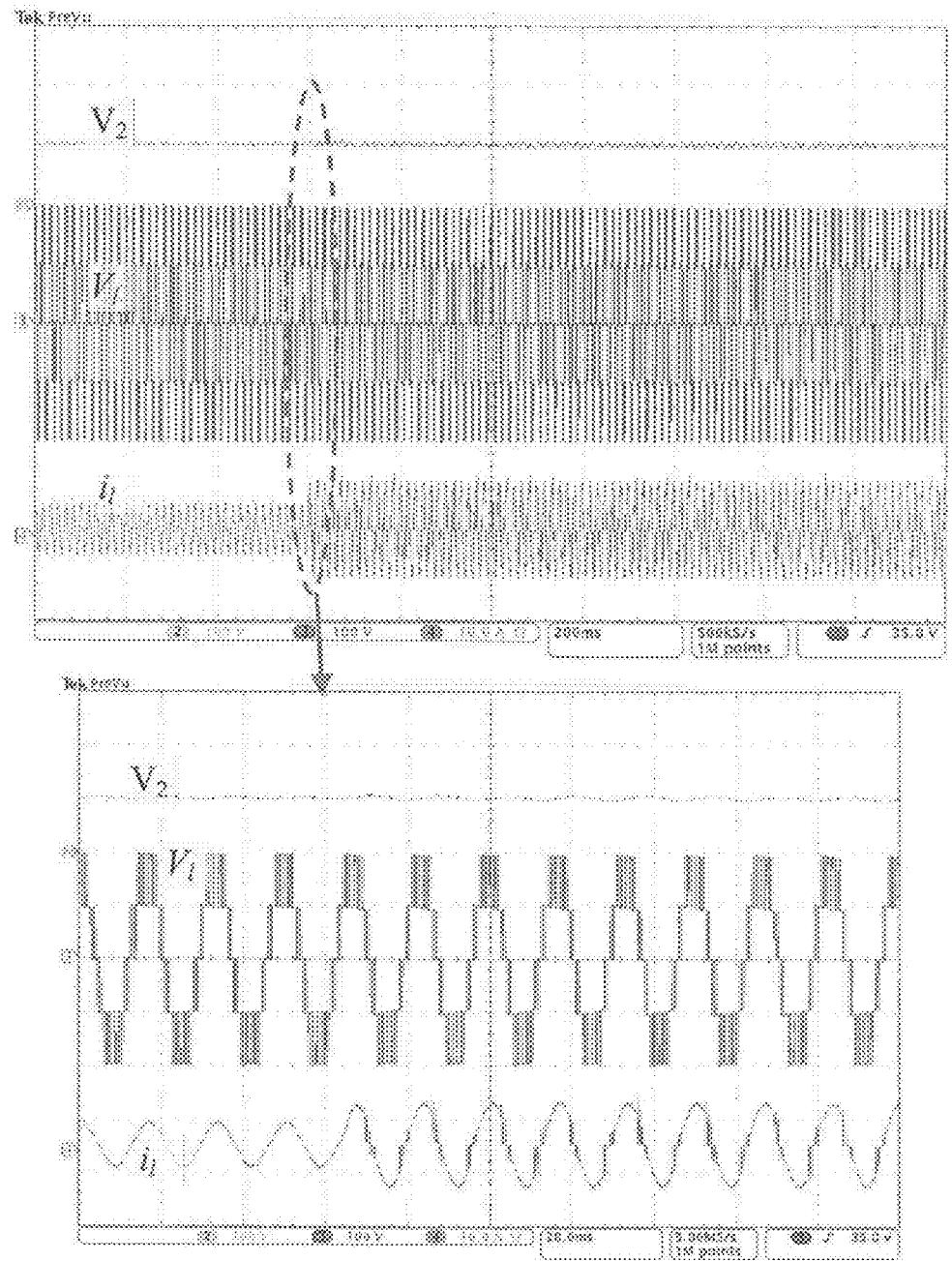
FIG. 8 illustrates the performance of the five-level PUC inverter in stand-alone mode of operation, in variable load conditions, in accordance with one embodiment.

In another test, a nonlinear load is added at the inverter's output. The nonlinear load illustratively consists of a single-phase rectifier connected to a resistance $R_{dc}$ and of an inductance $L_{dc}$ on its DC side connected in parallel with the existing RL load. The nonlinear load is then fed by the inverter. Results are illustrated in FIG. 8 and demonstrate the good dynamic performance of the proposed technique in variable load conditions.

Figure 9:
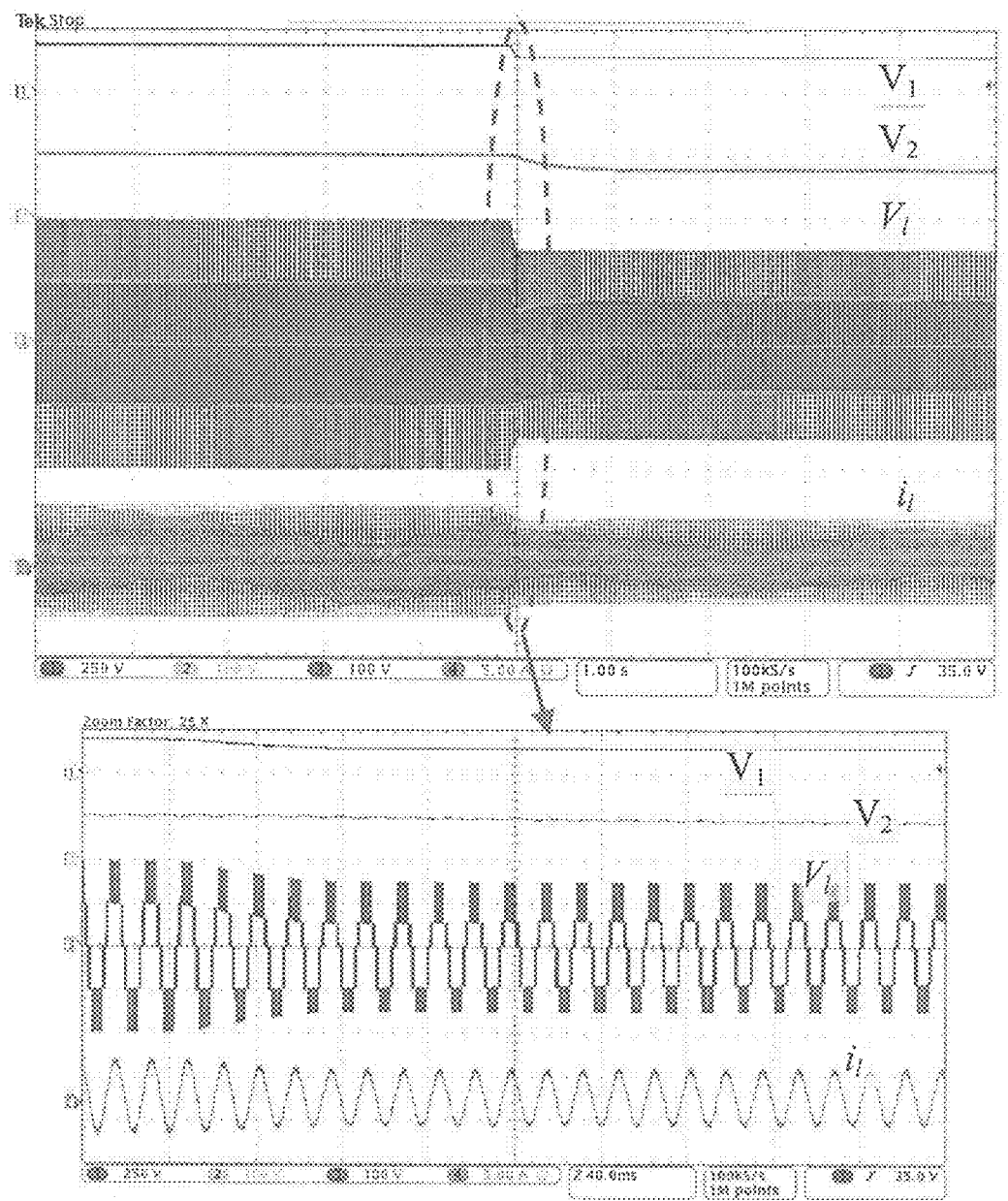
FIG. 9 illustrates the capacitor voltage as a result of changes in the DC source voltage for the five-level PUC inverter in stand-alone mode of operation, in accordance with one embodiment.

FIG. 9 illustrates a case where the DC source voltage is changing and the results show that the capacitor voltage ($V_2$) still tracks the reference value ($V_1/2$) properly (e.g. remains at half of the DC source value (V1) as the latter decreases) as a result of applying the proposed sensor-less voltage regulator technique integrated into the switching pattern.

Figure 10:
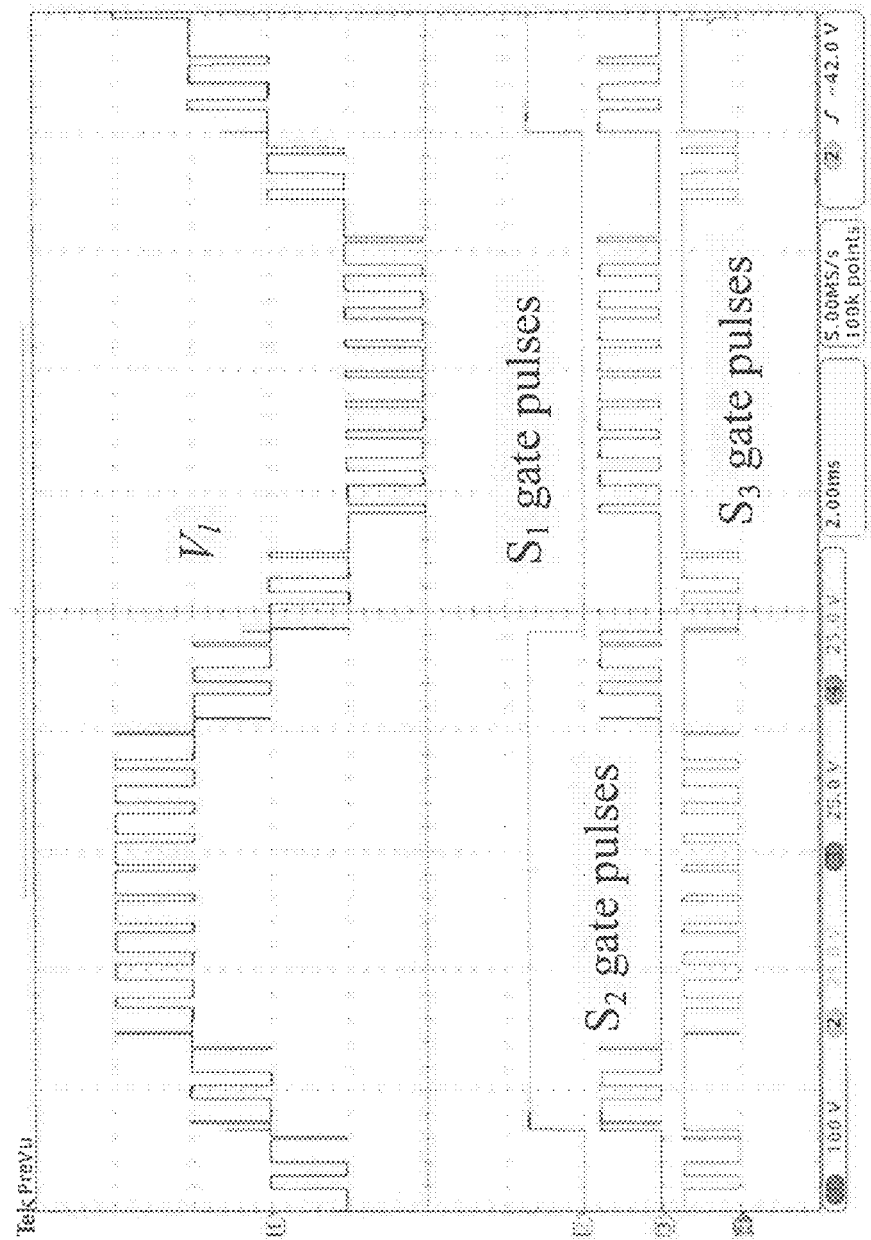
FIG. 10 illustrates switching gate pulses and one cycle of output voltage for the five-level PUC inverter in stand-alone mode of operation, in accordance with one embodiment.

FIG. 10 illustrates switching firing pulses generated by the switching unit (reference 400 in FIG. 4) in stand-alone mode and applied to switches 14, 16, and 18 of FIG. 1 (respectively S1, S2, and S3 gate pulses) as well as one cycle of the five-level output voltage waveform ($V_l$). It can be seen from the "S1 gate pulses" graph, which corresponds to the switching pulses applied to the switch 14, that the switch 14 and its complementary switch 20, i.e. the two upper switches in the circuit 10 of FIG. 1, are operating at grid frequency. It can also be seen from FIG. 10 that the remaining switches, namely the four lower switches 16, 18, 22, 24 in FIG. 1, are fired with higher frequency than the upper switches, as seen from the "S2 gate pulses" and "S3 gate pulses" graphs, which correspond to the switching pulses applied to switches 14 and 16, and accordingly provide an indication of the switching pulses applied to the complementary switches 22 and 24. Therefore, six switches with different ratings (with the voltage ratings of the four lower switches 16, 18, 22, 24 being equal to half that of the two upper switches 14, 20) are illustratively used in the proposed inverter topology.

Indeed, in the proposed inverter topology, the switch which supports the highest voltage is illustratively controlled to operate at the lowest switching frequency, and vice-versa. This reduces switch stress and improves the performance of the multilevel electric power inverter. In one embodiment, the two upper switches 14, 20 can be low-frequency high-voltage switches like GTOs or IGCTs while the remaining four switches 16, 18, 22, 24 can be IGBTs or MOSFETs capable of operating in higher frequency but with lower voltage ratings. Although not illustrated, the test results also showed that the proposed switching technique allowed to achieve an output voltage total harmonic distortion (THD) of about 10% without the use of bulky harmonic filters. Given the low level of the output waveform's harmonic content, the proposed inverter topology does not necessitate large output filters and therefore proves to be cost-effective and results in a low-cost, light, and portable package.

Figure 11:
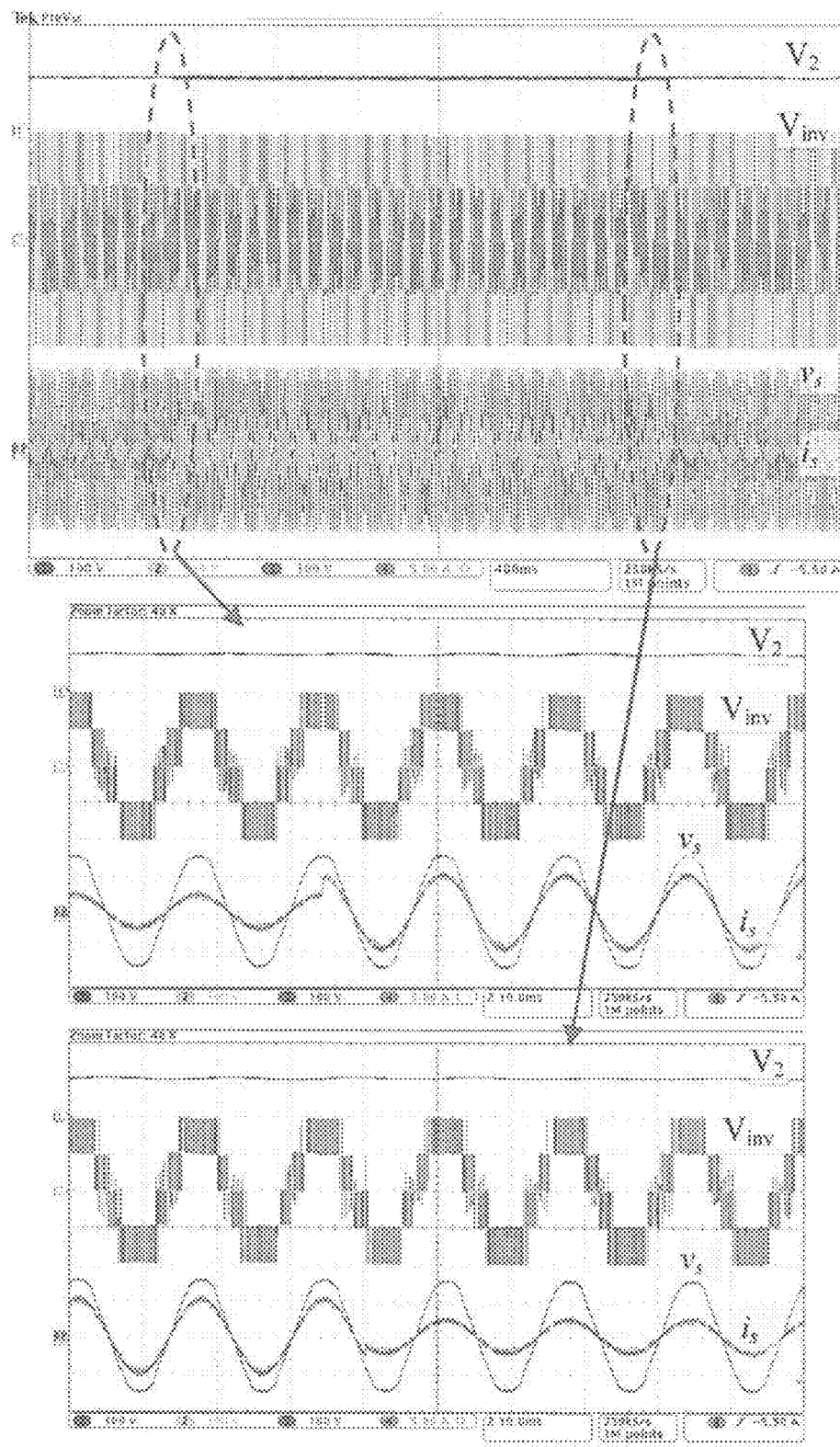
FIG. 11 illustrates the performance of a five-level PUC inverter in a grid-connected mode of operation, in accordance with one embodiment.
Figure 12:
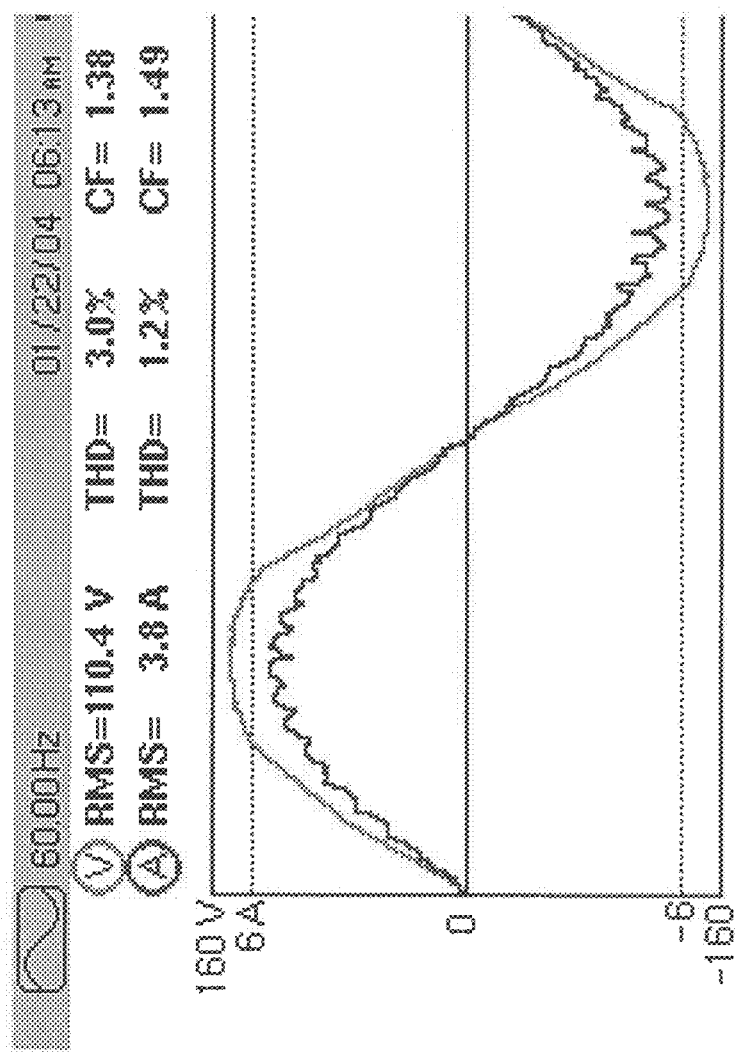
FIG. 12 is a graph illustrating the total harmonic distortion result for the five-level PUC inverter in grid-connected mode of operation, in accordance with one embodiment.

In a second set of tests, discussed herein with reference to FIGS. 11 and 12, the inverter was tested in grid-connected mode. For this purpose, the inverter was connected to a single-phase AC source that behaved as the grid. The inverter's controller (reference 604 in FIG. 6) was then used to force the inverter to inject power to the grid with unity power factor. In order to show the fast response and proper dynamic performance of the designed grid-connected controller as well as the proposed sensor-less voltage balancing technique, the current reference was changed during the test and results are illustrated in FIG. 11.

It can be seen from FIG. 11 that the grid-connected inverter is operating with unity power factor and injecting active power to the grid. The grid-connected controller is working acceptably in making the current waveform ($i_S$) in phase with the AC voltage waveform ($v_S$). Moreover, the proposed sensor-less self-voltage-balancing method allows to regulate the capacitor voltage at the desired level despite encountering changes in the system, and produces a five-level voltage at the inverter's output. Since a five-level voltage waveform is generated at the output of the grid-connected inverter, the current injected through grid would have lower harmonic components without necessitating the use of additional filters that would enlarge the inverter's package. FIG. 12 also illustrates the THD of current injected into the grid and shows that the achieved THD is significantly lower than the generally accepted standards.

Figure 13:
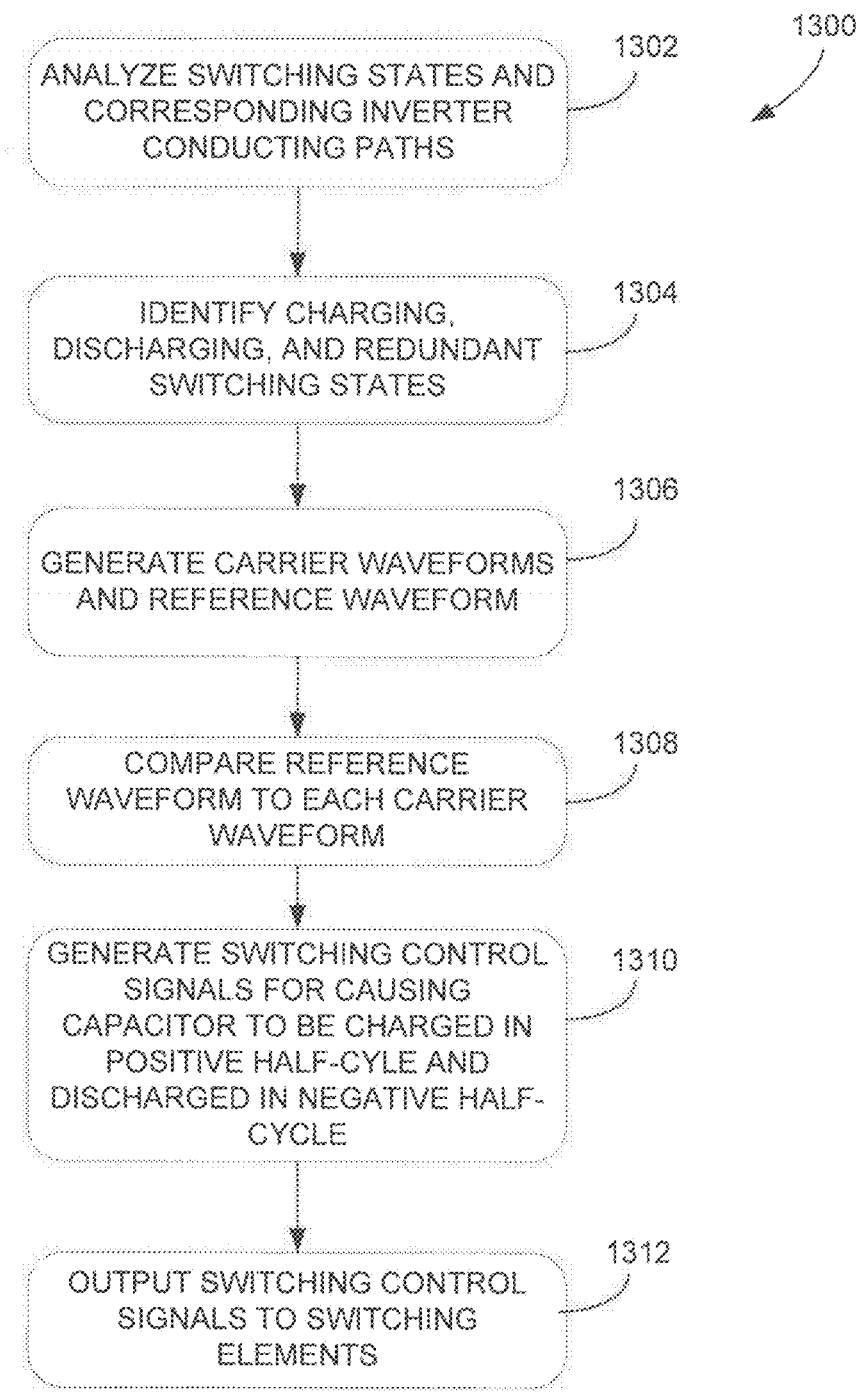
FIG. 13 is a flowchart of a method for implementing a sensor-less self-voltage-balancing switching technique, in accordance with one embodiment.

Referring now to FIG. 13, a method 1300 for implementing the above-mentioned sensor-less self-voltage-balancing switching technique according to one embodiment will now be described. The method 1300 comprises analyzing at step 1302 the inverter's switching states and the corresponding conducting paths. Then, charging, discharging, and redundant switching states are identified, as per 1304 and as discussed above with reference to FIGS. 1 to 3. Carrier waveforms and a reference waveform are then generated at step 1306 and the reference waveform is compared to each carrier waveform at step 1308, as discussed above with reference to FIGS. 4 and 5. Switching control signals are in turn generated at step 1310, as discussed above with reference to FIGS. 4 and 5, on the basis of the comparison for causing the inverter's capacitor to be charged in the positive half-cycle of the inverter's output voltage and discharged in the negative half-cycle, thereby balancing the capacitor's voltage to half of the DC source's voltage. The switching control signals are then sent to the switching elements at step 1312 to control the inverter's switching elements and generate the output levels accordingly.

While the circuits illustrated in the figures show a single phase inverter, it should be understood that the method, circuit topologies, and control strategies may be adapted to three phase inverters without deviating from the scope of the present invention.

Moreover, while the above described inverters 10 or 602 of FIGS. 1 and 6 are controlled by a sensor-less self-voltage balancing technique, the inverters 10 or 602 are also controllable by an alternate balancing technique using a capacitor voltage sensor and an alternate balancing unit.

Figure 2B:
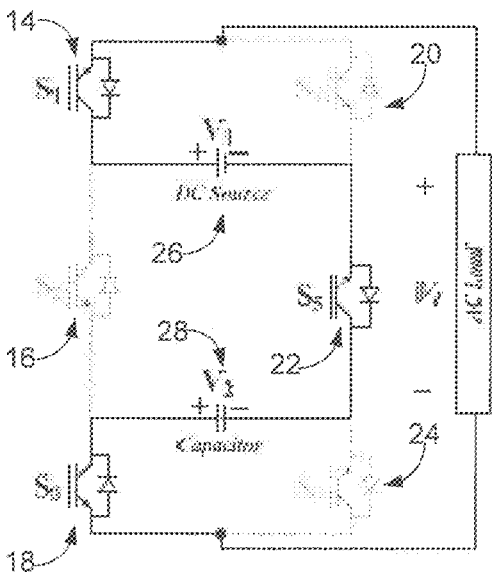
Figure 2C:
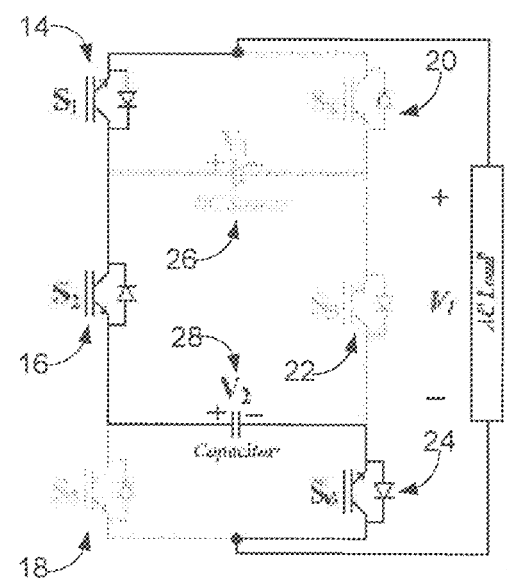
Figure 2D:
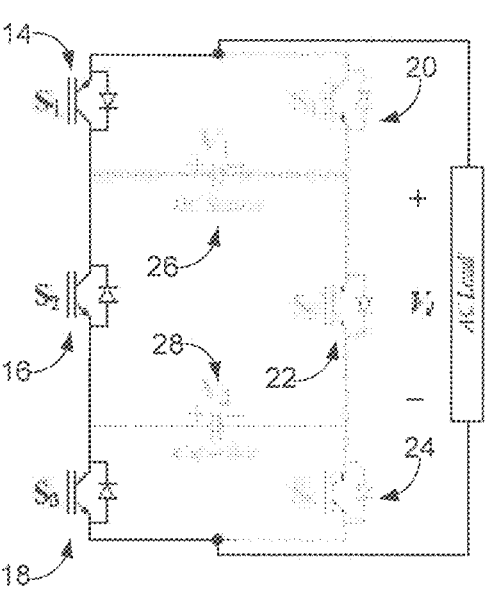

For instance, as indicated in Table 4 and as presented in FIGS. 2B and 2C, switching states 2 and 3 both produce a voltage level of +E at the output of the inverter 10 while using different switches to connect the DC source 26 or capacitor 28. The same is applicable for switching states 6 and 7, as further presented in FIGS. 2F and 2G. Charging of the capacitor 28 occurs when it is connected to the DC source 26 through an appropriate switching path, as shown in FIGS. 2B and 2G. Discharging of the capacitor 28 occurs when it is connected to the output alone without using any DC source 26 through an appropriate switching path, as shown in FIGS. 2C and 2F. Considering the charging and discharging effects on the capacitor 28 as shown in Table 5 for those states, another voltage balancing technique for the inverter 10 or 602 is presented in FIG. 14.

Figure 14:
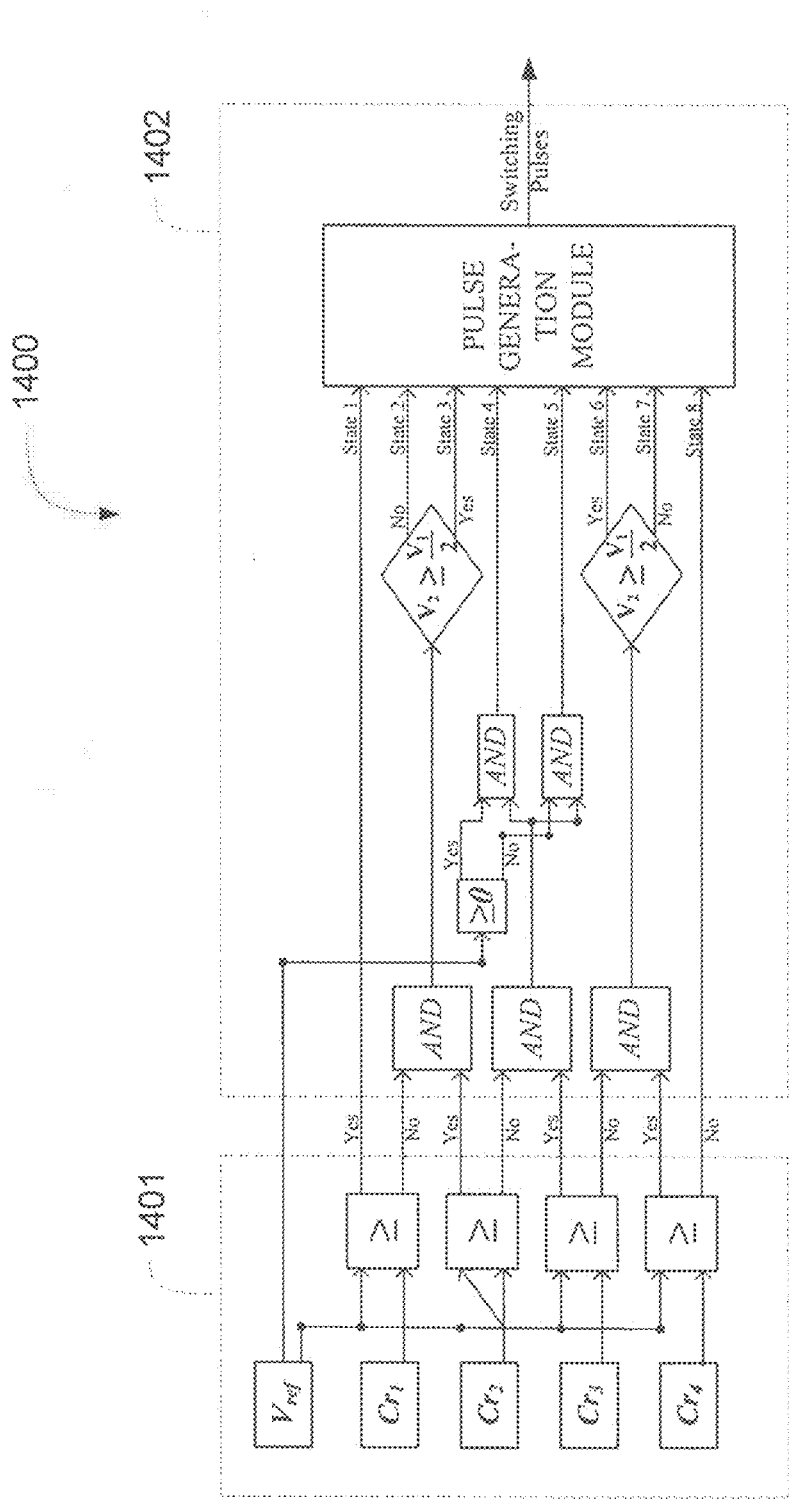
FIG. 14 is a schematic of a controller for voltage-balancing of the five-level inverter of FIG. 1, in accordance with one embodiment.

In FIG. 14, there is illustrated a switching unit 1400 having a modulating unit 1401 and voltage balancing unit 1402 that are adapted to generate switch signal waveforms (i.e. pulses) according to eight states for controlling the switching elements 14, 16, 18, 20, 22 and 24 of inverter 10 of FIG. 1 or the switching elements $603_1$, $603_2$, $603_3$, $603_4$, $603_5$, $603_6$ of inverter 602 of FIG. 6. The voltage balancing unit 1402 uses a voltage measurement of the capacitor 28 or 602 as a feedback from a voltage sensor connected in parallel to the capacitor 28 or 602. With this alternate balancing technique, when the output voltage level is +E (i.e. states 2 or 3) or when the output voltage level is −E (i.e. states 6 or 7), a voltage measurement (i.e. V2) of the capacitor 28 or 602 is compared to the DC source 26 or 622 amplitude.

According to some embodiments, and considering Table 4, FIG. 14 and FIG. 1 for an output voltage level that is +E, if the voltage measurement of the capacitor 28 is less than half of the amplitude of DC source 26 (i.e. V1/2), switching state 2 is sent to the switches for charging the capacitor 28. For an output voltage level that is −E, if the voltage measurement of the capacitor 28 is less than half of the amplitude of DC source 26 (i.e. V1/2), switching state 7 is sent to the switches for charging the capacitor. However, for an output voltage level that is +E, when V2≥(V1/2), then switching state 3 is sent to the switches for discharging the capacitor 28. For an output voltage level that is −E, when V2≥(V1/2), then switching state 6 is sent to the switches for discharging the capacitor 28.

This alternate balancing technique allows to sufficiently balance the capacitor voltage to the extent that the capacitor 28 or 620 of FIGS. 1 and 6 may be replaced by a capacitor having a lower capacitance, such as a film capacitor, which is known to have a longer life span and to be available at a lower cost.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. While illustrated in the block diagrams as groups of discrete components communicating with each other via distinct data signal connections, it will be understood by those skilled in the art that the present embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A controller for a multilevel electric power inverter circuit, the controller comprising:
a modulation circuit configured for generating a plurality of command signals, the command signals indicative of switching states for a plurality of switching elements in the inverter circuit to obtain a given voltage level at an output of the inverter circuit; and
a voltage balancing circuit connected to the modulation circuit and connectable to the plurality of switching elements, and configured to generate, as a function of the command signals, switch signal waveforms as half-cycles of an alternating current waveform having alternating periods of positive and negative, for selective opening and closing of the plurality of switching elements to charge and discharge an energy storage device by series connecting the energy storage device with a direct current source and one of a load and an alternating current source to charge the energy storage device and by disconnecting the energy storage device from the direct current source and series connecting the energy storage device with the one of the load and the alternating current source to discharge the energy storage device, in order to obtain the given voltage level.

2. The controller of claim 1, wherein the switch signal waveforms comprise a first plurality of control signals during a positive half-cycle of the alternating current waveform in order to charge the energy storage device of the inverter circuit, and a second plurality of control signals during a negative half cycle of the alternating current waveform in order to discharge the energy storage device.

3. The controller of claim 1, wherein the voltage balancing circuit is configured for generating the switch signal waveforms for six switching states.

4. The controller of claim 1, wherein the modulation circuit is configured for comparing an amplitude of at least one reference waveform to a plurality of carrier waves for generating the plurality of command signals.

5. The controller of claim 4, wherein the carrier waves have a same frequency and amplitude and are vertically shifted relative to one another, and the reference waveform is centered with respect to the carrier waves.

6. The controller of claim 1, further comprising a voltage sensor connected to the inverter circuit and configured for measuring a voltage of the energy storage device in the inverter circuit and providing the voltage as measured to the voltage balancing circuit, and wherein the voltage balancing circuit is configured for generating the switch signal waveforms as a function of the voltage as measured.

7. The controller of claim 6, wherein the voltage balancing circuit is configured for generating the switch signal waveforms for eight switching states.

8. A method for operating a multilevel electric power inverter circuit, the method comprising:
generating command signals indicative of switching states for a plurality of switching elements in the inverter circuit to obtain a given voltage level at an output of the inverter circuit;
generating, as a function of the command signals, switch signal waveforms as half-cycles of an alternating current waveform having alternating periods of positive and negative, for selective opening and closing of the plurality of switching elements to charge and discharge an energy storage device in order to obtain the given voltage level; and
applying the switch signal waveforms to the plurality of switching elements to charge and discharge the energy storage device in order to generate the given voltage level at the output of the inverter circuit, by applying a first plurality of control signals to cause the energy storage device to be series connected with a direct current source and one of a load and an alternating current source and charged to a predetermined value proportional to a voltage of the direct current source, and applying a second plurality of control signals to cause the energy storage device to be disconnected from the direct current source and series connected with the one of the load and the alternating current source, thereby causing the energy storage device to be discharged.

9. The method of claim 8, wherein applying the switch signal waveforms comprises applying a third plurality of control signals for causing the energy storage device to be disconnected from the direct current source and the one of the load and the alternating current source in order for the load and the alternating current source to be connected to the direct current source, and applying a fourth plurality of control signals for causing the energy storage device to be disconnected from the direct current source and the one of the load and the alternating current source in order for the load and the alternating current source to be connected to the direct current source in reverse polarity.

10. The method of claim 9, wherein applying the switch signal waveforms comprises applying a fifth plurality of control signals and a sixth plurality of control signals for causing the energy storage device and the direct current source to be disconnected from the one of the load and the alternating current source.

11. The method of claim 8, wherein applying the switch signal waveforms comprises applying the first plurality of control signals during a positive half cycle of the alternating current waveform, and applying the second plurality of control signals during a negative half cycle of the alternating current waveform.

12. The method of claim 11, wherein applying the first plurality of control signals comprises causing the energy storage device to be charged to a voltage that is half of the direct current source voltage.

13. The method of claim 8, further comprising measuring a voltage of the energy storage device in the inverter circuit and generating the switch signal waveforms as a function of the voltage as measured.

14. A multilevel electric power inverter system for converting a direct current value into an alternating current waveform having alternating periods of positive and negative half cycle, the system comprising:
 a plurality of switching elements connected in series in a closed loop, selective opening and closing of the plurality of switching elements resulting in given voltage levels for the inverter circuit;
 a direct current source and an energy storage device connected within the closed loop such that each of the direct current source and the energy storage device is connected to four of the plurality of switching elements;
 one of a load and an alternating current source connected across the closed loop at nodes between adjacent switching elements that are separate from nodes to which the direct current source and the energy storage device are connected; and
 a controller connected to the plurality of switching elements and configured to generate and apply to the plurality of switching elements switch signal waveforms, the switch signal waveforms comprising a first plurality of control signals for causing the energy storage device to be series connected with the direct current source and the one of the load and the alternating current source and charged to a predetermined value proportional to a voltage of the direct current source, and a second plurality of control signals for causing the energy storage device to be disconnected from the direct current source and series connected with the one of the load and the alternating current source, thereby causing the energy storage device to be discharged.

15. The system of claim 14, wherein the controller comprises:
 a modulation circuit configured for generating a plurality of command signals, the command signals indicative of switching states for the plurality of switching elements to obtain a given voltage level at an output of the inverter circuit; and
 a voltage balancing circuit connected between the modulation circuit and the plurality of switching elements, and configured to generate, as a function of the command signals, the switch signal waveforms as half-cycles of an alternating current waveform having alternating periods of positive and negative.

16. The system of claim 15, wherein the switch signal waveforms comprise a first plurality of control signals during a positive half-cycle of the alternating current waveform in order to charge an energy storage device of the inverter circuit, and a second plurality of control signals during a negative half cycle of the alternating current waveform in order to discharge the energy storage device.

17. The system of claim 14, wherein the controller is configured for generating the switch signal waveforms in accordance with six switching states.

18. The system of claim 14, further comprising a voltage sensor connected for measuring a voltage of the energy storage device and providing the voltage as measured to the controller, and wherein the controller is configured for generating the switch signal waveforms as a function of the voltage as measured.

19. The system of claim 18, wherein the controller is configured for generating the switch signal waveforms in accordance with eight switching states.

* * * * *